US 8,373,871 B2

(12) United States Patent
Taki et al.

(10) Patent No.: US 8,373,871 B2
(45) Date of Patent: Feb. 12, 2013

(54) IMAGE FORMING APPARATUS

(75) Inventors: Norikazu Taki, Kanagawa (JP);
Nobuhito Komoda, Tokyo (JP);
Kazushi Takei, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 1223 days.

(21) Appl. No.: 12/172,587

(22) Filed: Jul. 14, 2008

(65) Prior Publication Data
US 2009/0034021 A1 Feb. 5, 2009

(30) Foreign Application Priority Data

Jul. 31, 2007 (JP) .................................. 2007-200089
Apr. 17, 2008 (JP) .................................. 2008-107972

(51) Int. Cl.
*G06K 15/00* (2006.01)
*G06F 3/12* (2006.01)

(52) U.S. Cl. .................... 358/1.14; 358/1.15; 358/1.13; 358/468; 358/474; 358/471

(58) Field of Classification Search ................. 358/1.15, 358/1.14, 1.13, 401, 501, 471, 474, 296, 358/468; 713/300, 310, 320
See application file for complete search history.

(56) References Cited

U.S. PATENT DOCUMENTS

| 5,956,160 A * | 9/1999 | Watanabe ...................... 358/496 |
| 6,185,010 B1 * | 2/2001 | Watanabe ...................... 358/474 |
| 2003/0142164 A1 * | 7/2003 | Nishida ........................... 347/19 |

FOREIGN PATENT DOCUMENTS

| JP | 9-321925 | | 12/1997 |
| JP | 11034437 A | * | 2/1999 |
| JP | 2002-370423 | | 12/2002 |
| JP | 3738434 | | 11/2005 |
| JP | 2006211499 A | * | 8/2006 |

* cited by examiner

*Primary Examiner* — Cheukfan Lee
(74) *Attorney, Agent, or Firm* — Oblon, Spivak, McClelland, Maier & Neustadt, L.L.P.

(57) ABSTRACT

An image forming apparatus includes a scanning device and a printing device. The scanning device and the printing device are configured to be separately arranged when the image forming apparatus is in use. The printing device includes a control unit that transmits and receives signals to and from a plurality of units included in the scanning device, and a power supplying unit that supplies electric power to the units. The scanning device includes a first relay substrate that receives electric power from the power supplying unit and distributes the electric power to the units, and relays signals between each of the units and the control unit.

15 Claims, 24 Drawing Sheets

IMAGE FORMING APPARATUS

CROSS-REFERENCE TO RELATED APPLICATIONS

The present application claims priority to and incorporates by reference the entire contents of Japanese priority documents 2007-20089 filed in Japan on Jul. 31, 2007 and 2008-107972 filed in Japan on Apr. 17, 2008.

BACKGROUND OF THE INVENTION

1. Field of the Invention

The present invention relates to an image forming apparatus including a printing device and a scanning device.

2. Description of the Related Art

There is a need to separately arrange a printing device and a scanning device included in an image forming apparatus, such as a copy machine, for improvement of usability. For example, every user including a healthy person and a person in a wheel chair wants to place an image forming apparatus at an accessible height to operate the image forming apparatus in an easy manner. Because accessible heights to an image forming apparatus depend on users, the image forming apparatus can be more user friendly if a printing device and a scanning device can be easily separated depending on needs. Especially, in a case of large-sized copy machines capable of handling originals of larger than A3 size, separate arrangement of a printing device and a scanning device much enhances operability.

However, a conventional copy machine is designed based on assumption that a printing device and a scanning device are integrally arranged while the copy machine is in use. Therefore, an electrical configuration or a mechanical configuration of the conventional copy machine is not preferable for separating the printing device and the scanning device. In some conventional copy machines, the printing device and the scanning device are simply connected to each other via a harness. For example, Japanese Patent Application Laid-open No. H09-321925 discloses such a conventional copy machine.

Harnesses are connected between the scanning device and the printing device to transmit signals from each of sensors included in the scanning device to the printing device. Generally, three harnesses, i.e., a power-supply harness, a ground (GND) harness, and a signal harness, need to be arranged for each of the sensors. The harnesses are put together as a bundle and covered with a shield. Therefore, if the number of harnesses arranged for the sensors increases, the thickness of the bundle of the harnesses also increases, making it difficult to arrange the bundle of the harnesses in a desired place.

In a case of copy machines capable of handling originals of A3 or smaller size, an original-size detecting sensor included in a scanning device generally performs scanning operation on the original that is placed on an exposure glass without conveying the original. In such a copy machine, the size of the original is detected in two dimensions, i.e., a width and a length of the original. The size of the original is detected by a matrix that is defined based on positions of original-size detecting sensors. With this configuration, multiple sizes can be detected by using the small number of original-size detecting sensors.

However, in a case of large-sized copy machines capable of handling originals of larger than A3 size, a size of an original to be scanned can be various. To detect the size of an original, a width of the original is first detected when the original is placed on a platen. Afterward, a length of the original is detected based on a time from when the original is inserted from a first position to when the original is discharged from a second position. With such a configuration, to detect the width of the original placed on the platen, sensors need to be arranged in a line in accordance with the width of an original to be scanned. If ten sensors are arranged for detection of the width, as much as 30 harnesses are necessary for the ten sensors, making a bundle of the harnesses thick. Thus, it is difficult to arrange the thick bundle of the harnesses.

SUMMARY OF THE INVENTION

It is an object of the present invention to at least partially solve the problems in the conventional technology.

According to an aspect of the present invention, there is provided an image forming apparatus including a scanning device and a printing device, wherein the scanning device and the printing device are configured to be separately arranged when the image forming apparatus is in use, wherein the printing device includes a control unit that transmits and receives signals to and from a plurality of units included in the scanning device; and a power supplying unit that supplies electric power to the units, and the scanning device includes a first relay substrate that receives electric power from the power supplying unit and distributes the electric power to the units, and relays signals between each of the units and the control unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

A copy machine is exemplary described below as an image forming apparatus according to embodiments of the present invention. However, the image forming apparatus can be other devices such as multifunction products, printers, or facsimiles.

Figure 1:
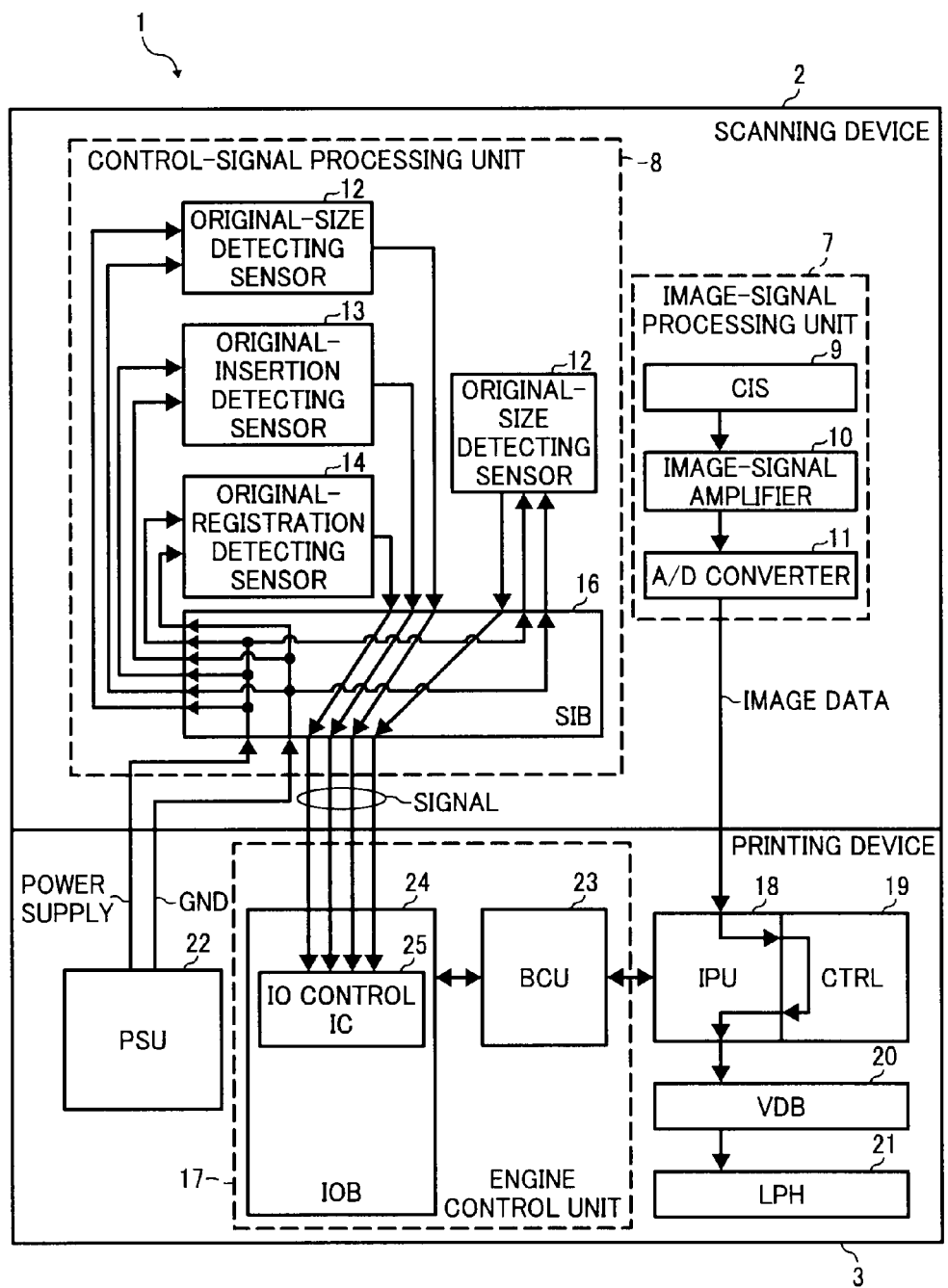
FIG. 1 is a block diagram of a copy machine according to a first embodiment of the present invention when a scanning device and a printing device are integrally arranged.

FIG. 1 is a block diagram of a copy machine 1 according to a first embodiment of the present invention. The copy machine 1 includes a scanning device 2 and a printing device 3. Although the scanning device 2 and the printing device 3 are integrally arranged in FIG. 1, the scanning device 2 and the printing device 3 can be separately arranged depending on a request from a user.

Figure 2:
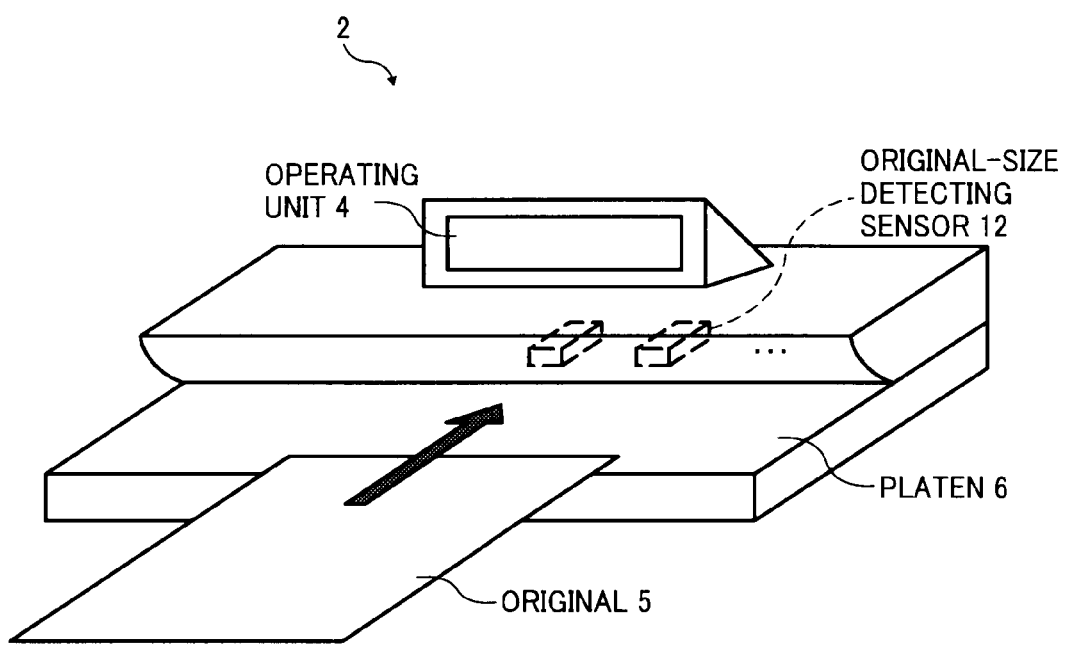
FIG. 2 is a schematic diagram of the scanning device shown in FIG. 2.

FIG. 2 is a schematic diagram of the scanning device 2. The scanning device 2 is an automatic document feeder scanner. When settings are entered by using an operating unit 4 and an original 5 is placed on a platen 6 such that the original 5 is inserted into a direction indicated by an arrow in FIG. 2, the original 5 is conveyed in that direction. Then, two original-size detecting sensors 12 detect a size of the original 5. The original-size detecting sensors 12 are arranged inside the scanning device 2. A contact image sensor (CIS) 9 then scans an image on the original 5. The scanning device 2 can be divided into two functionally different units, i.e., an image-signal processing unit 7 and a control-signal processing unit 8. The image-signal processing unit 7 performs operation on images. The control-signal processing unit 8 performs operation on scanning control.

The image-signal processing unit 7 includes the CIS 9, an image-signal amplifier 10, and an analog-to-digital (A/D) converter 11. The CIS 9 scans an image on the original 5 and generates an analog signal from the image. The image-signal amplifier 10 amplifies the analog signal generated by the CIS 9. The A/D converter 11 converts the analog signal to a digital signal.

The control-signal processing unit 8 includes the original-size detecting sensors 12, an original-insertion detecting sensor 13, an original-registration detecting sensor 14, a scanner driving unit (not shown), and a relay substrate (SIB) 16. The scanner driving unit is, for example, a motor, a clutch, or a solenoid for conveying the original 5. The original-size detecting sensor 12 detects a size of the original 5. Because the original-size detecting sensor 12 detects a width of an original, the original-size detecting sensors 12 are arranged in a line in the main scanning direction. The number of the original-size detecting sensors 12 to be arranged depends on the maximum size of an original to be scanned. In a case of copy machines capable of handling originals of larger than A3 size, an original to be inserted can be of any size from A0 to A4 sizes. For example, to scan an image on an original of any of A0 to A4 sizes and B1 to B4 sizes, nine original-size detecting sensors need to be arranged. If the copy machine is to scan an image on an original of other sizes, the number of the original-size detecting sensors arranged in the copy machine increases to handle the other sizes.

The original-insertion detecting sensor 13 detects insertion of the original 5. The original-registration detecting sensor 14 detects a leading end and a trailing end of the original 5. Hereinafter, the original-size detecting sensors 12, the original-insertion detecting sensor 13, and the original-registration detecting sensor 14 are collectively referred to as the sensors 12, 13, 14, as appropriate.

In the first embodiment as described above, the scanning device 2 includes the original-insertion detecting sensor 13 and the original-registration detecting sensor 14. Generally, it is sufficient to arrange one original-insertion detecting sensor and one original-registration detecting sensor. However, it can be configured such that a plurality of original-insertion detecting sensors and a plurality of original-registration detecting sensors are arranged.

The SIB 16 transmits/receives a signal to/from an engine control unit 17 (an input-output control unit (IOB) 24) in the printing device 3, and receives electric power from a power-supply unit (PSU) 22 in the printing device 3. The configurations and operations of the engine control unit 17, the IOB 24, and the PSU 22 will be described later. Functions of the SIB 16 will also be described later in detail.

The printing device 3 includes the engine control unit 17, an image processing unit (IPU) 18, a controller (Ctrl) 19, a writing control unit (VDB) 20, a light-emitting diode print head (LPH) 21, and the PSU 22. The engine control unit 17 performs a process of conveying a sheet, such as a transfer sheet, controls input/output to/from the sensors 12, 13, 14 and the scanner driving unit, and controls the copy machine 1. The engine control unit 17 includes a central processing unit (CPU) (not shown) and a memory (not shown). The engine control unit 17 includes a main control unit (BCU) 23 and the IOB 24. The BCU 23 controls the copy machine 1. The IOB 24 controls the sensors 12, 13, 14, the scanner driving unit, or the like. The IOB 24 includes an IO control integrated circuit (IC) 25.

The IPU 18 includes a plurality of CPUs (processors) (not shown). The IPU 18 performs required image processing. The Ctrl 19 controls timing at which image data is output, and generates image writing data. The VDB 20 controls writing operation performed by the LPH 21 to write an image on a transfer sheet conveyed in accordance with a writing timing based on the image writing data. The LPH 21 is an optical device, such as an LED, and writes an image on a photosensitive element (not shown).

The PSU 22 receives electric power from a commercial power supply (not shown), and supplies the received electric power to the SIB 16. The electric power is supplied from the SIB 16 to each device (the scanning device 2 and the printing device 3) in the copy machine 1. In the first embodiment, a case in which the electric power is supplied to the control-signal processing unit 8 will be described in detail later.

An image scanned by the scanning device 2 is converted into digital data by the A/D converter 11. The digital data is then transmitted to the IPU 18. The IPU 18 performs required image processing by using the processors. After the image processing is completed, the data is sent to the Ctrl 19, and then is stored in a storage unit (not shown), such as a hard disk drive.

The Ctrl 19 extracts required data from the storage unit in accordance with output timing for each image data. The Ctrl 19 then stores the extracted data in a line memory (not shown) depending on a condition, such as the number of copies, or a printing mode. The Ctrl 19 then transmits the data to the VDB 20 as image writing data. The LPH 21 writes an image on the photosensitive element in accordance with writing timing in response to a command from the VDB 20. The image written on the photosensitive element is developed by using toner, and a toner image is then transferred onto a transfer sheet conveyed by a transfer-sheet stacking unit (not shown), such as a cassette. In this manner, printing operation is performed.

Figure 3:
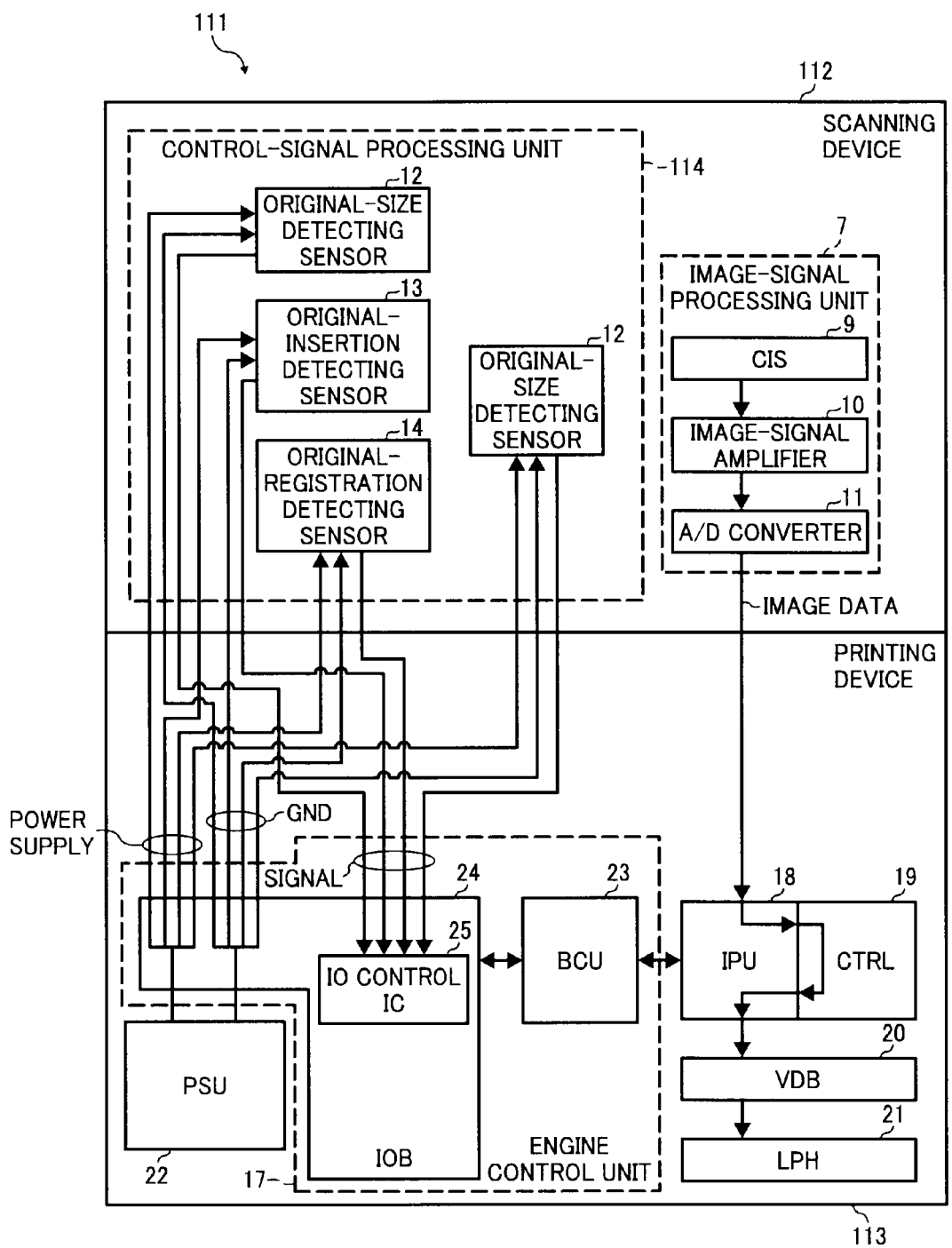
FIG. 3 is a block diagram of a conventional copy machine when a scanning device and a printing device are integrally arranged.

FIG. 3 is a block diagram of a conventional copy machine 111. The copy machine 111 includes a scanning device 112 and a printing device 113 in the same manner as the copy machine 1. Although the scanning device 112 and the printing device 113 are integrally arranged in FIG. 3, the scanning device 112 and the printing device 113 can be separately arranged depending on a request from a user.

The scanning device 112 includes the image-signal processing unit 7 and a control-signal processing unit 114. The control-signal processing unit 114 includes the two original-size detecting sensors 12, the original-insertion detecting sensor 13, the original-registration detecting sensor 14, and the scanner driving unit. The copy machine 111 is functionally different from the copy machine 1 in that the scanning device 112 does not include the SIB 16.

The printing device 113 includes the engine control unit 17, the IPU 18, the Ctrl 19, the VDB 20, the LPH 21, and the PSU 22.

The PSU 22 supplies electric power to the IOB 24. The IOB 24 distributes and supplies the electric power to each of the sensors 12, 13, 14. The copy machine 111 is different from the copy machine 1 in that the printing device 113 performs this operation for supplying electric power.

A signal wire, a power-supply wire, and a GND wire are connected between each of the sensors 12, 13, 14 and the printing device 113. The signal wire is arranged to transmit a signal detected by each of the sensors 12, 13, 14 to the IOB 24. The power-supply wire and the GND wire are arranged to supply the electric power from the PSU 22 to each of the sensors 12, 13, 14. Although not shown, a plurality of signal wires, a power-supply wire, and a GND wire are connected between the scanner driving unit and the printing device 113. The signal wires are arranged to transmit a signal (a control signal) for a command to drive a motor or the like from the IOB 24 to the scanner driving unit. The power-supply wire and the GND wire are arranged to supply the electric power from the PSU 22 to the scanner driving unit. Detailed descriptions on the signal wire, the power-supply wire, and the GND wire connected between the scanner driving unit and the printing device 113 are omitted.

Figure 4:
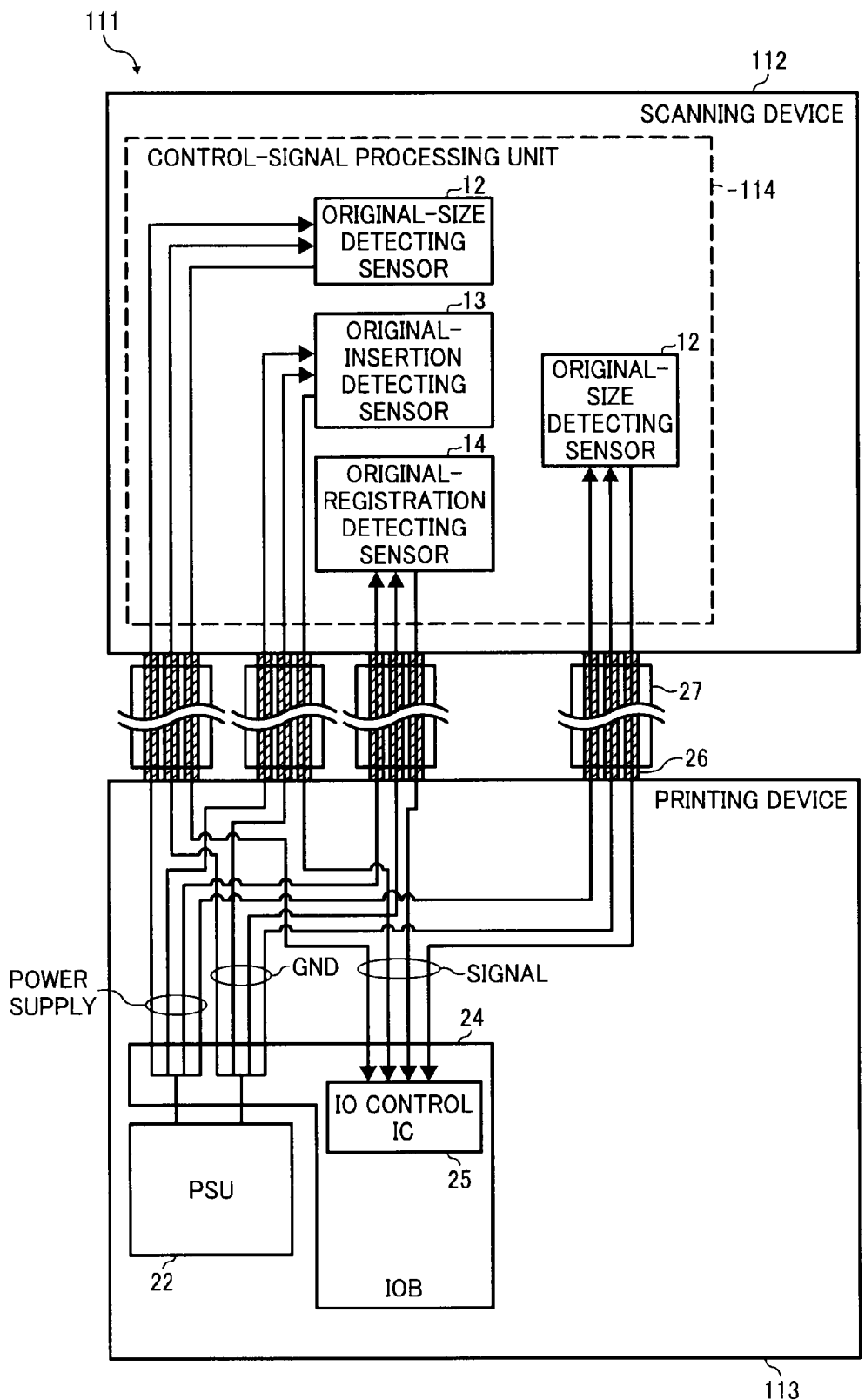
FIG. 4 is a block diagram of the conventional copy machine when the scanning device and the printing device are separately arranged.

FIG. 4 is a block diagram of the conventional copy machine 111 when the scanning device 112 and the printing device 113 are separately arranged. For convenience of explanation, only the control-signal processing unit 114, the IOB 24, and the PSU 22 are shown in FIG. 4.

Three harnesses 26, i.e., harnesses for the signal wire, the power-supply wire, and the GND wire, are connected between each of the sensors 12, 13, 14 and the printing device 113. Therefore, as much as 12 of the harnesses 26 are connected between the sensors 12, 13, 14 and the printing device 113. As a result, it is difficult to perform operation of connecting the harnesses 26 between connectors (not shown) in the scanning device 112 and connectors (not shown) in the printing device 113.

The three harnesses 26 need to be connected to connectors (not shown) arranged for each of the sensors 12, 13, 14. Therefore, it can be more difficult to perform operation of connecting the harnesses 26 depending on positions at which the connectors are arranged. Furthermore, because the harnesses 26 are put together as a bundle and covered with a shield 27, the bundle of the harnesses 26 is thicker, and it is more difficult to arrange the bundle of the harnesses 26 in a desired position.

In the copy machine 1, the scanning device 2 includes the SIB 16, and has a configuration in which a common power-supply wire and a common GND wire are used for supplying the electric power to the sensors 12, 13, 14. The PSU 22 supplies the electric power to the SIB 16 via the common power-supply wire and the common GND wire. The SIB 16 then distributes and supplies the electric power to each of the sensors 12, 13, 14.

Furthermore, in the copy machine 1, signal wires for transmitting signals from the sensors 12, 13, 14 to the IOB 24 are collectively connected to the SIB 16, and then connected to the printing device 3.

Specifically, when the scanning device 2 and the printing device 3 are integrally arranged, typical short harnesses (not shown) are connected between connectors (not shown) in the scanning device 2 and connectors (not shown) in the printing device 3. Thus, the signal wires, the power-supply wire, and the GND wire are connected between the printing device 3 and the sensors 12, 13, 14.

Figure 5:
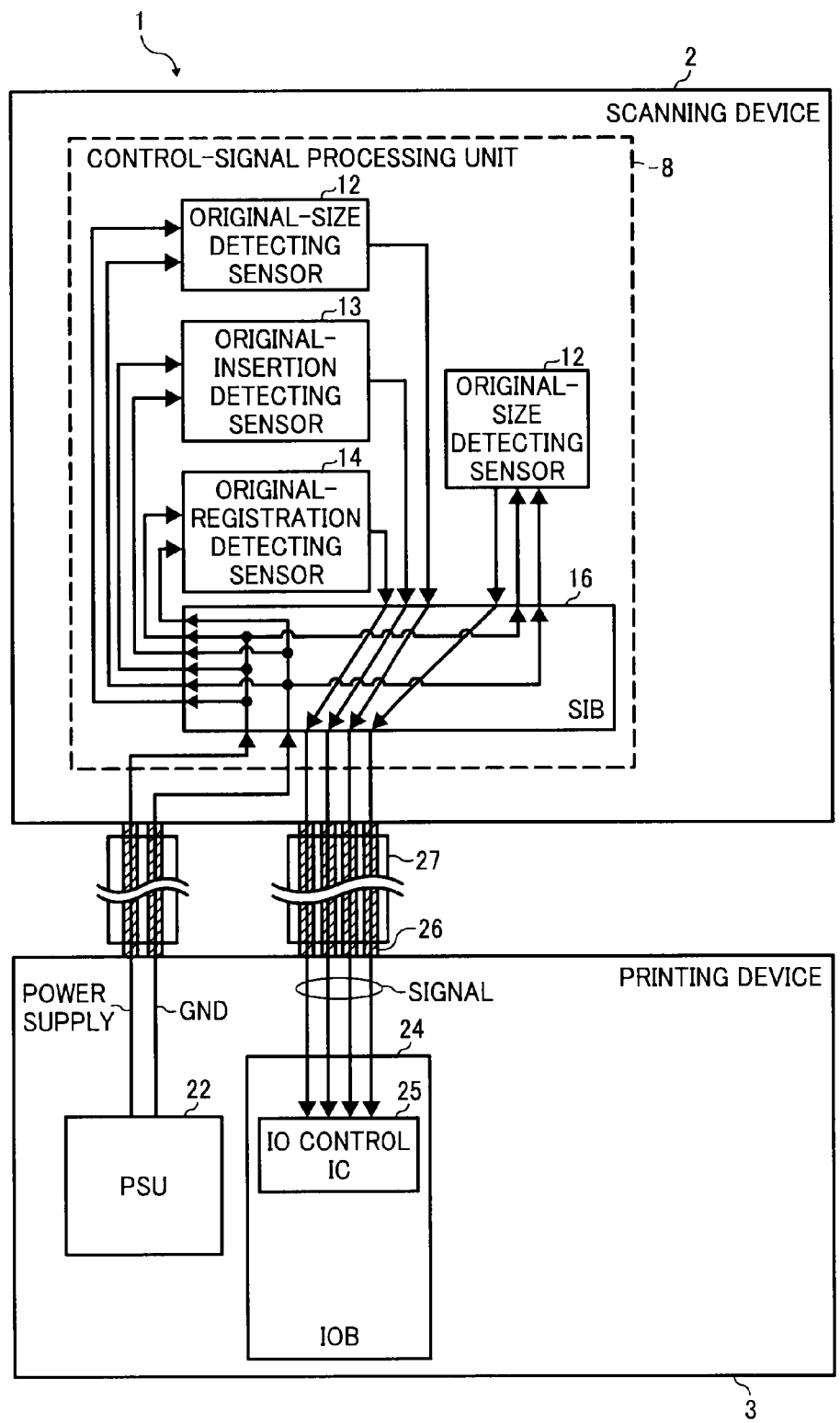
FIG. 5 is a block diagram of the copy machine according to the first embodiment when the scanning device and the printing device are separately arranged.

FIG. 5 is a block diagram of the copy machine 1 when the scanning device 2 and the printing device 3 are separately arranged. For convenience of explanation, only the control-signal processing unit 8, the IOB 24, and the PSU 22 are shown in FIG. 5.

Four harnesses 26 for the signal wires are connected between the sensors 12, 13, 14 and the printing device 3. A common harness 26 for the power-supply wire and a common harness 26 for the GND wire are connected between the sensors 12, 13, 14 and the printing device 3. Thus, six harnesses 26 are connected between the scanning device 2 and the printing device 3. The number of the harnesses 26 used in the copy machine 1 is half of that in the copy machine 111.

With this configuration, it is easier to perform operation of connecting the harnesses 26 between connectors (not shown) in the scanning device 2 and connectors (not shown) in the printing device 3. Because the number of the harnesses 26 is reduced, it is possible to reduce costs for the harnesses 26. Furthermore, occurrence of electromagnetic waves can be reduced. Therefore, it is possible to solve a problem of electromagnetic compatibility (EMC) in an easier manner.

The harnesses 26 for the signal wires are simply connected to connectors (not shown) arranged in the SIB 16. This makes it easier to perform operation of connecting the harnesses 26. Furthermore, because the number of the harnesses 26 is reduced, and therefore the bundle of the harnesses 26 becomes thinner, it is easier to perform operation of arranging the harnesses 26 in a desired position. Moreover, it is possible to improve appearance of the arranged wires.

The advantages described above can be more obtained if the number of the sensors 12, 13, 14 in the scanning device 2 is larger. Especially, because a copy machine capable of handling large-sized originals includes a large number of the original-size detecting sensors 12, the advantages can be further obtained.

Although the operation of supplying the electric power to the control-signal processing unit 8 is described in the first embodiment, operation of supplying the electric power from the PSU 22 to the image-signal processing unit 7 is not described in detail. It can be configured, in the same manner as described above, that a common power-supply wire and a common GND wire are used for supplying the electric power to the image-signal processing unit 7 and the control-signal processing unit 8. The PSU 22 supplies the electric power to the SIB 16 via the common power-supply wire and the common GND wire. The SIB 16 then distributes and supplies the electric power to the image-signal processing unit 7.

In an image forming apparatus according the first embodiment, the SIB 16 receives the electric power from the PSU 22, and then distributes the received electric power to each unit in the scanning device 2. The SIB 16 also relays a signal between each unit in the scanning device 2 and the IOB 24. With this configuration, the common power-supply wire and the common GND wire are connected between the PSU 22 and the scanning device 2. The PSU 22 supplies the electric power to the SIB 16 via the common power-supply wire and the common GND wire. Therefore, it is possible to reduce the number of the harnesses 26 connected between the scanning device 2 and the printing device 3. Thus, the operability can be improved in changing the arrangement of the copy machine 1 between the integral arrangement and the separate arrangement.

In a second embodiment of the present invention, each of a scanning device and a printing device includes a low voltage differential signaling (LVDS) driver and an LVDS receiver. A signal is transmitted between the LVDS driver and the LVDS receiver.

In the second embodiment, description on components of a copy machine 31, except for the same components as those of the copy machine 1, is explained.

Figure 6:
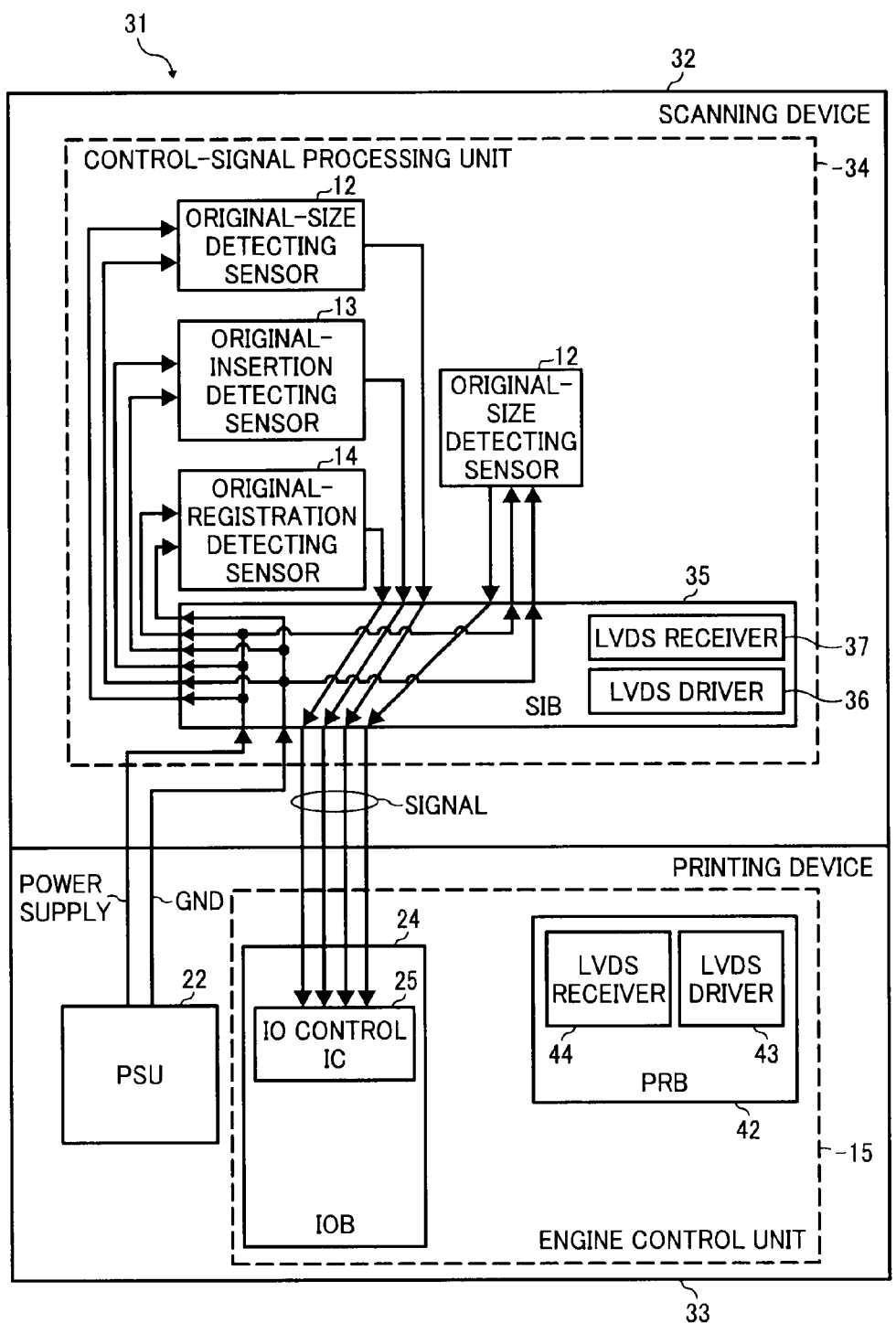
FIG. 6 is a block diagram of a copy machine according to a second embodiment of the present invention when a scanning device and a printing device are integrally arranged.

FIG. 6 is a block diagram of the copy machine 31. The image-signal processing unit 7, the IPU 18, the Ctrl 19, the VDB 20, the LPH 21, and the BCU 23 are not shown in FIG. 6, because the configurations of those are the same as those in the first embodiment, and therefore, the same explanations are not repeated.

The copy machine 31 includes a scanning device 32 and a printing device 33. Although the scanning device 32 and the printing device 33 are integrally arranged in FIG. 6, the scanning device 32 and the printing device 33 can be separately arranged depending on a request from a user.

The scanning device 32 includes the image-signal processing unit 7 and a control-signal processing unit 34. The control-signal processing unit 34 includes the two original-size detecting sensors 12, the original-insertion detecting sensor 13, the original-registration detecting sensor 14, the scanner driving unit, and an SIB 35.

The SIB 35 transmits/receives a signal to/from an engine control unit 15 (the IOB 24) based on differential-type serial data. The SIB 35 also receives the electric power from the PSU 22.

Figure 7:
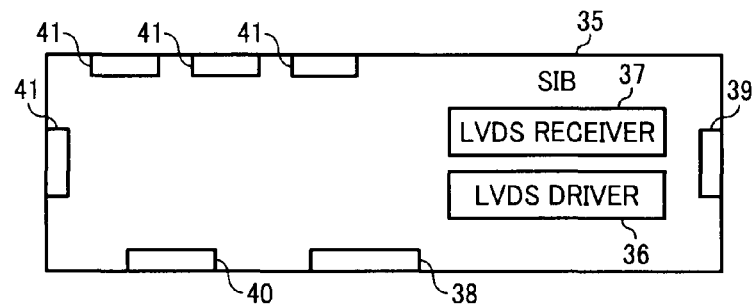
FIG. 7 is a block diagram of an SIB included in the copy machine according to the second embodiment.

FIG. 7 is a block diagram of the SIB 35. The SIB 35 includes an LVDS driver 36, an LVDS receiver 37, a connector 38 for integral arrangement, a connector 39 for separate arrangement, a connector 40 for power supply, and connectors 41. The LVDS driver 36 receives parallel signals from the sensors 12, 13, 14, and then converts the received parallel signals into serial signals. The LVDS driver 36 then transmits the serial signals to an LVDS receiver 44 in the printing device 33. The configuration and operation of the LVDS receiver 44 will be described in detail later. The LVDS receiver 37 receives a serial signal from an LVDS driver 43 in the printing device 33, and converts the received serial signal into a parallel signal. The LVDS receiver 37 then sends the parallel signal to the scanner driving unit. The configuration and operation of the LVDS driver 43 will be described in detail later.

The connector 38 is connected to the signal wires for the sensors 12, 13, 14 when the scanning device 32 and the printing device 33 are integrally arranged. In such a case, a parallel signal is transmitted via the connector 38. The connector 39 is connected to the signal wires for the sensors 12, 13, 14 when the scanning device 32 and the printing device 33 are separately arranged. In such a case, a serial signal is transmitted via the connector 39. The SIB 35 includes a common circuit pattern that is used for the integral arrangement and the separate arrangement of the scanning device 32 and the printing device 33. With this configuration, it is possible to reduce a size of the SIB 35, and to reduce costs of the SIB 35.

The connector 40 is connected to the power-supply wire and the GND wire from the PSU 22. The connectors 41 are connected to the signal wires, the power-supply wire, and the GND wire for the sensors 12, 13, 14.

The printing device 33 includes the engine control unit 15, the IPU 18, the Ctrl 19, the VDB 20, the LPH 21, and the PSU 22. The engine control unit 15 includes the BCU 23, the IOB 24, and an LVDS mounted substrate (PRB) 42.

The PRB 42 includes the LVDS driver 43 and the LVDS receiver 44. The LVDS driver 43 receives a parallel signal from the IO control IC 25, and converts the received parallel signal into a serial signal. The LVDS driver 43 then transmits the serial signal to the LVDS receiver 37. The LVDS receiver 44 receives a serial signal from the LVDS driver 36, and converts the received serial signal into a parallel signal. The LVDS receiver 44 then transmits the parallel signal to the IO control IC 25.

As shown in FIG. 6, when the scanning device 32 and the printing device 33 are integrally arranged, signals are directly transmitted from the sensors 12, 13, 14 to the IO control IC 25 via the SIB 35. Although not shown, signals are directly transmitted from the IO control IC 25 to the scanner driving unit via the SIB 35.

Specifically, when the scanning device 32 and the printing device 33 are integrally arranged, typical short harnesses (not shown) are connected between the connectors 38, 40, and connectors (not shown) in the printing device 33. Thus, the signal wires, the power-supply wire, and the GND wire are connected between the printing device 33 and the sensors 12, 13, 14 and between the printing device 33 and the scanner driving unit.

In the first embodiment as described above, when the scanning device 2 and the printing device 3 are separately arranged, the harness 26 is arranged for the signal wire of each of the sensors 12, 13, 14, so that the scanning device 2 and the printing device 3 are connected to each other via the harnesses 26.

However, if the scanning device 2 and the printing device 3 are located far from each other, and therefore the harness 26 needs to be long, there occurs a problem, such as quality deterioration of signals, and instability of operation. To maintain a quality of signals, there is limitation in the arrangement of the copy machine 1. Especially, in a case of a copy machine that is larger than a copy machine capable of handling originals of A3 size, the scanning device 2 and the printing device 3 need to be located apart from each other by several meters for the separate arrangement. This may cause quality deterioration of signals.

One countermeasure for the above is to configure the copy machine 31 such that the SIB 35 includes the LVDS driver 36 and the LVDS receiver 37, and the PRB 42 includes the LVDS driver 43 and the LVDS receiver 44. The SIB 35 and the PRB 42 transmit/receive a signal to/from each other based on differential-type serial data that allows long distance transmission with low quality deterioration of signals. Thus, it is possible to achieve flexible arrangement of the copy machine 31.

Figure 8:
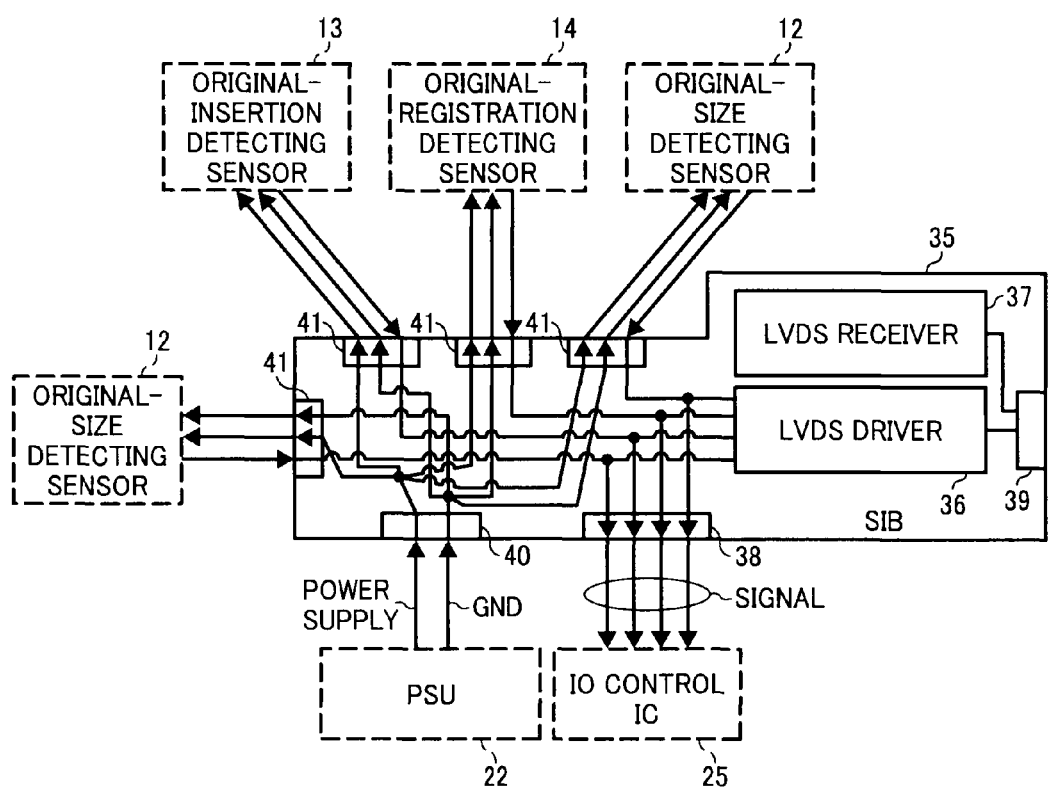
FIG. 8 is a block diagram for explaining flows of signals in the SIB according to the second embodiment when the scanning device and the printing device are integrally arranged.

FIG. 8 is a block diagram for explaining flows of signals in the SIB 35 when the scanning device 32 and the printing device 33 are integrally arranged. A power-supply signal and a GND signal are input from the PSU 22 to the connector 40. The power-supply signal and the GND signal are distributed by the SIB 35, and then output from the connectors 41 to each of the sensors 12, 13, 14 and the scanner driving unit.

Detected signals from the sensors 12, 13, 14 are input to the connectors 41, and output as they are (as parallel signals) from the connector 38 to the IO control IC 25. Although not shown, when a control signal (a parallel signal) is transmitted from the IO control IC 25 to the scanner driving unit, the control signal is input to the connector 38 from the IO control IC 25, and then output from the connector 38 to the scanner driving unit. The detected signals from the sensors 12, 13, 14 are divided by the SIB 35, and a part of the divided signals is sent from the SIB 35 to the LVDS driver 36. The detected signals are then converted into serial signals by the LVDS driver 36. The serial signals are delivered to the connector 39. Although not shown, a signal wire is always connected between the LVDS receiver 37 and the scanner driving unit.

When the integral arrangement of the scanning device 32 and the printing device 33 is changed to the separate arrangement, the signal wires for the sensors 12, 13, 14 and the scanner driving unit are connected to the connector 39 instead of the connector 38. In this manner, the integral arrangement of the scanning device 32 and the printing device 33 can be automatically changed to the separate arrangement.

Figure 9:
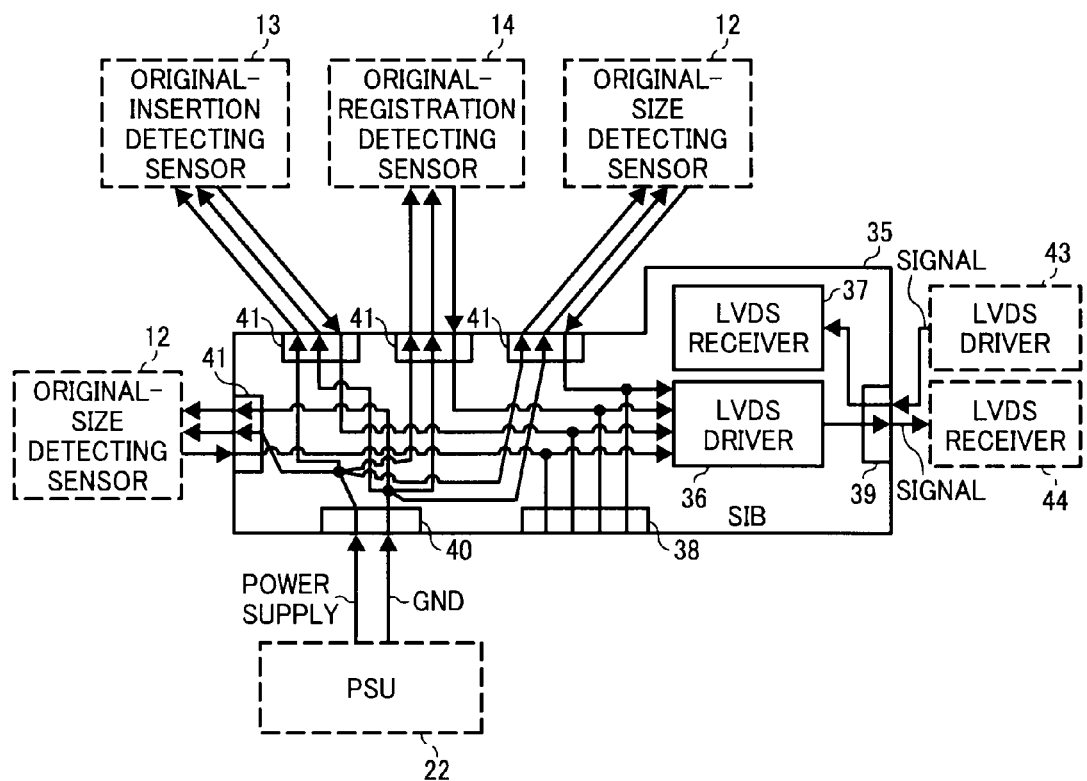
FIG. 9 is a block diagram for explaining flows of signals in the SIB according to the second embodiment when the scanning device and the printing device are separately arranged.

FIG. 9 is a block diagram for explaining flows of signals in the SIB 35 when the scanning device 32 and the printing device 33 are separately arranged. The flows of the power-supply signal and the GND signal from the PSU 22 are the same as those in the integral arrangement of the scanning device 32 and the printing device 33. A detected signal (a parallel signal) from each of the sensors 12, 13, 14 is input to the connector 41. The detected signal is then converted into a serial signal by the LVDS driver 36. The serial signal is then output from the connector 39 to the LVDS receiver 44.

When a control signal (a serial signal) is to be transmitted from the LVDS driver 43 to the scanner driving unit, the control signal is input to the connector 39 from the LVDS driver 43. The control signal is then converted into a parallel signal by the LVDS receiver 37. The parallel signal is then output from the LVDS receiver 37 to the scanner driving unit.

The detected signals from the sensors 12, 13, 14 are divided by the SIB 35, and a part of the divided signals is delivered to the connector 38. Although not shown, a signal wire is always connected between the connector 38 and the scanner driving unit. When the separate arrangement of the scanning device 32 and the printing device 33 is changed to the integral arrangement, the signal wires for the sensors 12, 13, 14 and the scanner driving unit are connected to the connector 38 instead of the connector 39. In this manner, the separate arrangement of the scanning device 32 and the printing device 33 can be automatically changed to the integral arrangement.

Figure 10:
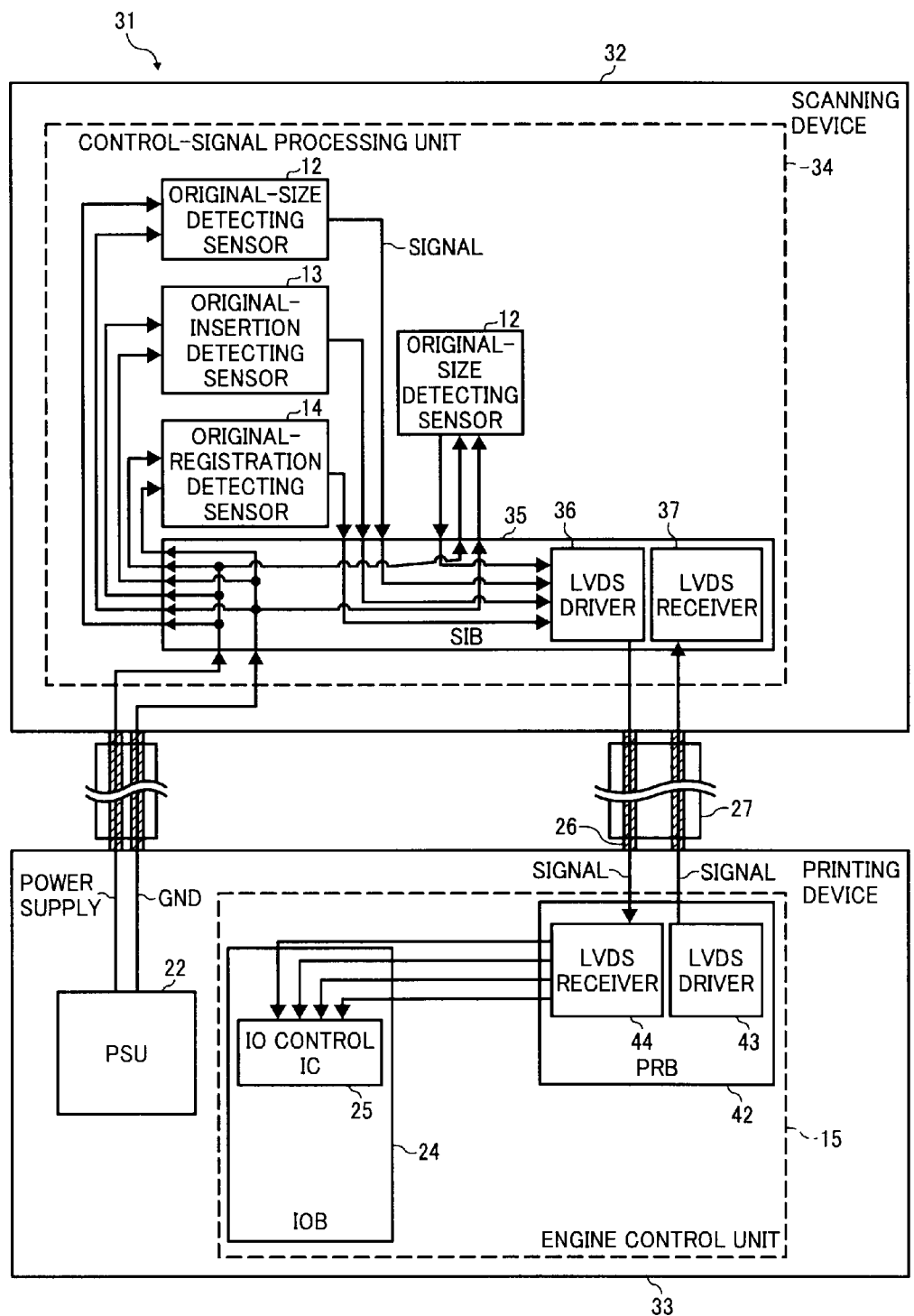
FIG. 10 is a block diagram of the copy machine according to the second embodiment when the scanning device and the printing device are separately arranged.

FIG. 10 is a block diagram of the copy machine 31 when the scanning device 32 and the printing device 33 are separately arranged. For convenience of explanation, only the control-signal processing unit 34, the IOB 24, the PSU 22, and the PRB 42 are shown in FIG. 10. When the scanning device 32 and the printing device 33 are separately arranged, a signal (a parallel signal) from each of the sensors 12, 13, 14 is converted into a serial signal by the LVDS driver 36. The serial signal is transmitted to the LVDS receiver 44 via the harness 26. The serial signal is then converted into a parallel signal by the LVDS receiver 44. The parallel signal is then sent from the LVDS receiver 44 to the IO control IC 25.

When a signal (a parallel signal) (not shown) is to be transmitted from the IO control IC 25 to the scanner driving unit, the signal is converted into a serial signal by the LVDS driver 43. The serial signal is then transmitted to the LVDS receiver 37 via the harness 26. The serial signal is then converted into a parallel signal by the LVDS receiver 37. The parallel signal is then sent from the LVDS receiver 37 to the scanner driving unit.

In the second embodiment, the three harnesses 26 are required, i.e., the harness 26 for the signal wires for the sensors 12, 13, 14 and the scanner driving unit, the common harness 26 for the power-supply wire, and the common harness 26 for the GND wire. Therefore, the number of the harnesses 26 is less than half of that in the copy machine 1. With this configuration, it is easier to perform operation of connecting the harness 26 between the connector 39 and a connector (not shown) in the printing device 33.

Because a bundle of the harnesses 26 is thinner, it is easier to perform operation of arranging the bundle of the harnesses 26 in a desired position. Furthermore, because the harness 26 is covered with the shield 27, a property for the EMC can be improved compared to a case an LVDS signal is transmitted by the harness 26 that is not covered with the shield 27.

Figure 11:
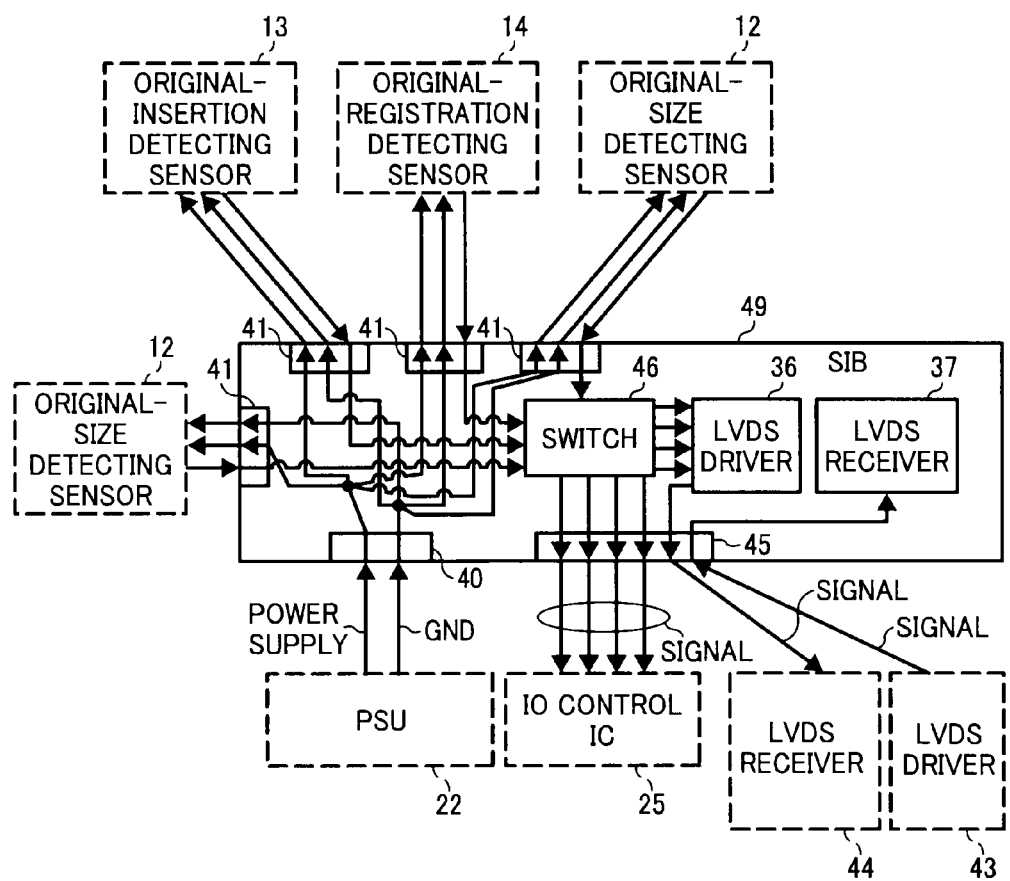
FIG. 11 is a block diagram of an SIB according to a modification of the second embodiment.

In the second embodiment, the SIB 35 includes the connector 38 and the connector 39. The connector 38 is used for the integral arrangement of the scanning device 32 and the printing device 33. The connector 39 is used for the separate arrangement of the scanning device 32 and the printing device 33. However, in a modification of the second embodiment, the same connector is used for the integral arrangement and the separate arrangement of the scanning device 32 and the printing device 33. FIG. 11 is a block diagram of an SIB 49 according to the modification. The SIB 49 includes a common connector 45 instead of the connector 38 and the connector 39.

Furthermore, the SIB 49 includes a switch 46 for switching operations. Specifically, in one operation, a signal from each of the sensors 12, 13, 14 is sent as it is to the common connector 45 (a signal from the printing device 33 is sent as it is to the scanner driving unit). In the other operation, a parallel signal from each of the sensors 12, 13, 14 is converted into a serial signal by the LVDS driver 36, and then the serial signal is sent to the common connector 45 (a serial signal from the printing device 33 is converted into a parallel signal by the LVDS receiver 37, and then the parallel signal is sent to the scanner driving unit).

The switch 46 includes, for example, a switch-signal wire that is connected to the IO control IC 25. When a switch signal is set to High in response to a command from the IO control IC 25, a signal from each of the sensors 12, 13, 14 is sent as it is to the common connector 45 (a signal from the printing device 33 is sent as it is to the scanner driving unit). A default state of the switch signal is set to Low. If the IO control IC 25 does not issue a command to set the switch signal to High, i.e., the switch signal is set to Low, a parallel signal from each of the sensors 12, 13, 14 is converted into a serial signal by the LVDS driver 36, and the serial signal is then sent to the common connector 45 (a serial signal from the printing device 33 is converted into a parallel signal by the LVDS receiver 37, and the parallel signal is then sent to the scanner driving unit). The configuration of the switch 46 is not limited to that described above. Any configuration can be employed as long as the switch 46 can switch the signal. With the configuration described above, it is possible to reduce the number of connectors in the SIB 35.

Figure 12:
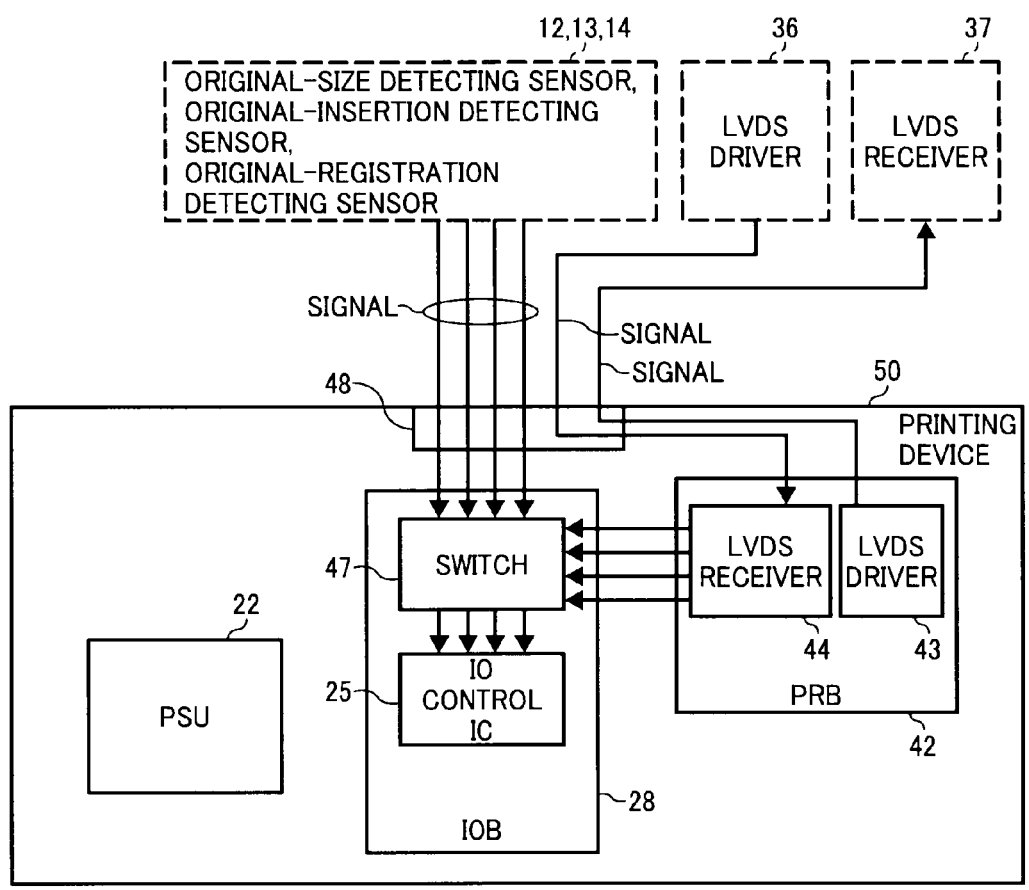
FIG. 12 is a block diagram of a printing device according to another modification of the second embodiment.

The printing device can be modified in the same manner. FIG. 12 is a block diagram of a printing device 50 according to another modification of the second embodiment. An IOB 28 includes a switch 47 for switching operations. It can be configured such that the PRB 42 includes the switch 47. In one operation, a signal from the IO control IC 25 is transmitted as it is to the scanning device 32 (a signal from each of the sensors 12, 13, 14 is transmitted as it is to the IO control IC 25). In the other operation, a parallel signal from the IO control IC 25 is converted into a serial signal by the LVDS driver 43, and then the serial signal is transmitted to the scanning device 32 (a serial signal from each of the sensors 12, 13, 14 is converted into a parallel signal by the LVDS receiver 44, and then the parallel signal is sent to the IO control IC 25. In this manner, the printing device 50 does not need to include different connectors for the integral arrangement and the separate arrangement. A common connector 48 can be used for the integral arrangement and the separate arrangement.

In an image forming apparatus according to the second embodiment, each of the SIB and the PRB includes the LVDS driver and the LVDS receiver. When the scanning device and the printing device are separately arranged, a normal signal is converted into a low voltage differential signal, and the low voltage differential signal is transmitted between the scanning device and the printing device. When the low voltage differential signal is received by the scanning device or the printing device, the low voltage differential signal is converted into a normal signal. The normal signal is then sent to each unit in the scanning device or the printing device. In this manner, it is possible to reduce the number of the harnesses 26 connected between the scanning device and the printing device. Therefore, the operability can be improved in changing the integral arrangement to the separate arrangement.

In the second embodiment, each of the SIB and the PRB includes the LVDS driver and the LVDS receiver. However, in a third embodiment of the present invention, a scanning device 52 is configured such that an SIB 55 is connectable to a separation substrate (SRB) 59 that includes an LVDS driver 63 and an LVDS receiver 64. Furthermore, a printing device 53 is configured such that an IOB 57 is connectable to a PRB 65 that includes an LVDS driver 67 and an LVDS receiver 68. When the scanning device 52 and the printing device 53 are separately arranged, the SRB 59 and the PRB 65 are connected to the SIB 55 and the IOB 57, respectively. Thus, signals are transmitted between the LVDS driver 63 and the LVDS receiver 68 and between the LVDS driver 67 and the LVDS receiver 64.

In the third embodiment, description on components of a copy machine 51, except for the same components as those of the copy machine 31, is explained.

Figure 13:
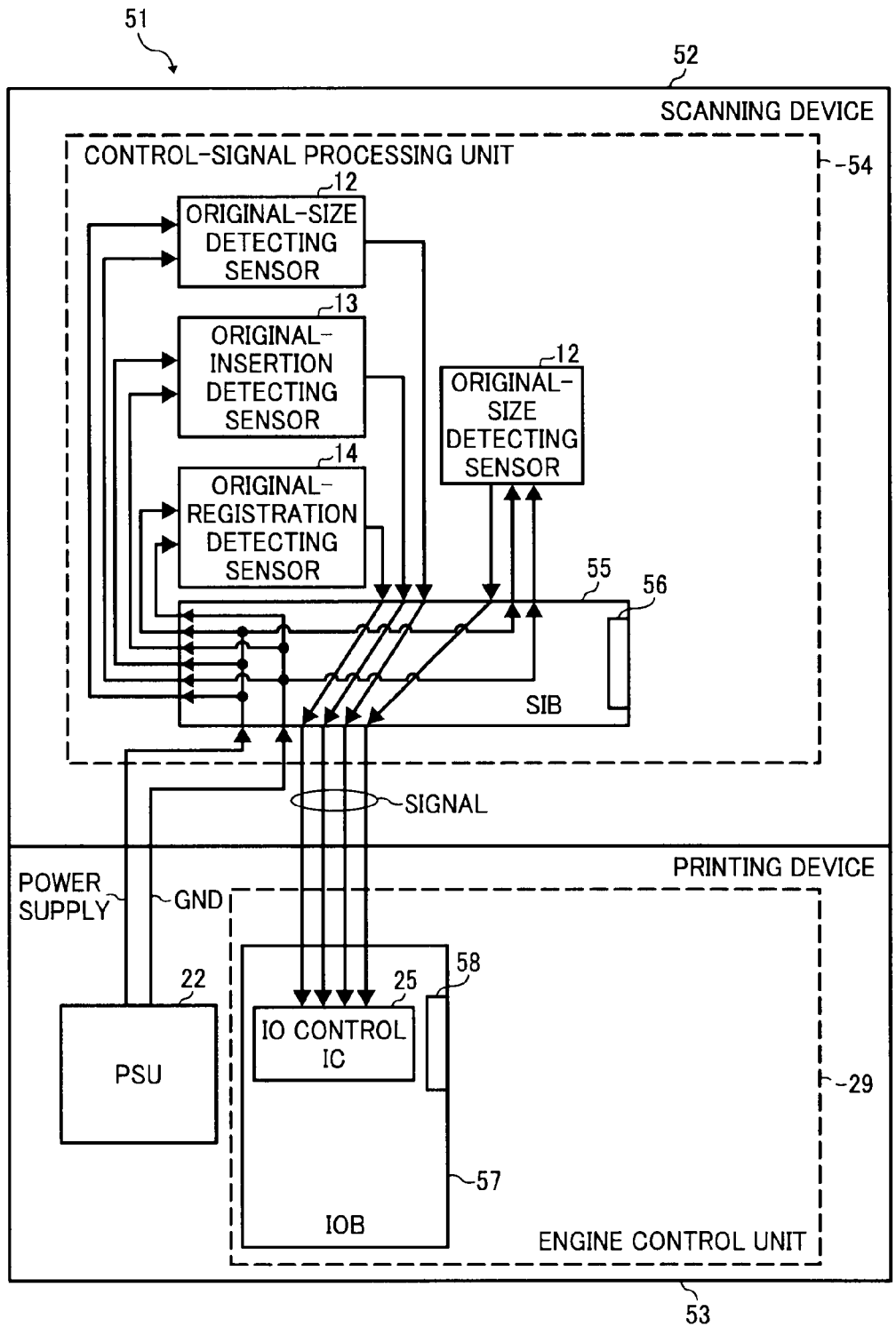
FIG. 13 is a block diagram of a copy machine according to a third embodiment of the present invention when a scanning device and a printing device are integrally arranged.

FIG. 13 is a block diagram of the copy machine 51. The image-signal processing unit 7, the IPU 18, the Ctrl 19, the VDB 20, the LPH 21, and the BCU 23 are not shown in FIG. 13, because the configurations of those are the same as those in the second embodiment.

The copy machine 51 includes the scanning device 52 and the printing device 53. Although the scanning device 52 and the printing device 53 are integrally arranged in FIG. 13, the scanning device 52 and the printing device 53 can be separately arranged depending on a request from a user.

The scanning device 52 includes the image-signal processing unit 7 and a control-signal processing unit 54. The control-signal processing unit 54 includes the two original-size detecting sensors 12, the original-insertion detecting sensor 13, the original-registration detecting sensor 14, the scanner driving unit, and the SIB 55.

The SIB 55 transmits/receives a signal to/from an engine control unit 29 (the IOB 57) in the printing device 53. The SIB 55 also receives electric power from the PSU 22.

Figure 14:
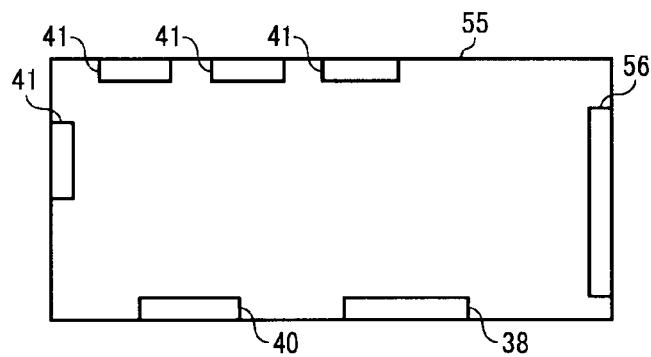
FIG. 14 is a block diagram of an SIB included in the copy machine according to the third embodiment.

FIG. 14 is a block diagram of the SIB 55. The SIB 55 includes the connectors 38, 40, 41, and an SRB interface 56. The SRB interface 56 is arranged to connect the SIB 55 with the SRB 59 when the scanning device 52 and the printing device 53 are separately arranged. Thus, the signal wires, the power-supply wire, and the GND wire for the sensors 12, 13, 14 and the scanner driving unit are connected to the SRB 59. The configuration and operation of the SRB 59 will be described later in detail.

The printing device 53 includes the engine control unit 29, the IPU 18, the Ctrl 19, the VDB 20, the LPH 21, and the PSU 22. The engine control unit 29 includes the BCU 23 and the IOB 57. The IOB 57 includes the IO control IC 25 and a PRB interface 58.

The PRB interface 58 is arranged to connect the IOB 57 with the PRB 65 when the scanning device 52 and the printing device 53 are separately arranged. Thus, a signal wire for the IO control IC 25 is connected to the PRB 65. The configuration and operation of the PRB 65 will be described later.

When the scanning device 52 and the printing device 53 are integrally arranged as shown in FIG. 13, a signal from each of the sensors 12, 13, 14 is transmitted as it is to the IO control IC 25 via the SIB 55. When a signal is to be transmitted from the IO control IC 25 to the scanner driving unit, the signal is transmitted as it is from the IO control IC 25 to the scanner driving unit via the SIB 55.

Specifically, when the scanning device 52 and the printing device 53 are integrally arranged, typical short harnesses (not shown) are connected between the connectors 38, 40 and connectors (not shown) in the printing device 53. Thus, the signal wire, the power-supply wire, and the GND wire is connected between the printing device 53 and each of the sensors 12, 13, 14, and between the printing device 53 and the scanner driving unit.

In the second embodiment described above, the SIB 35 includes the LVDS driver 36 and the LVDS receiver 37, and the PRB 42 includes the LVDS driver 43 and the LVDS receiver 44. When the scanning device 32 and the printing device 33 are separately arranged, the SIB 35 transmits/receives a signal to/from the PRB 42 based on differential-type serial data that allows long distance transmission with low quality deterioration of signals.

However, generally the scanning device and the printing device are integrally arranged while the copy machine is in use. If each of the scanning device and the printing device includes the LVDS driver and the LVDS receiver in preparation for the separate arrangement, costs of the copy machine is increased. By contrast, the copy machine 51 is configured so that, when the scanning device 52 and the printing device 53 are separately arranged, the SIB 55 is connected to the SRB 59, and the IOB 57 is connected to the PRB 65 such that the SRB 59 transmits/receives a signal to/from the PRB 65 using differential-type serial data. With this configuration, costs of the copy machine 51 can be reduced when the LVDS drivers 63, 67 and the LVDS receivers 64, 68 are not used.

Figure 15:
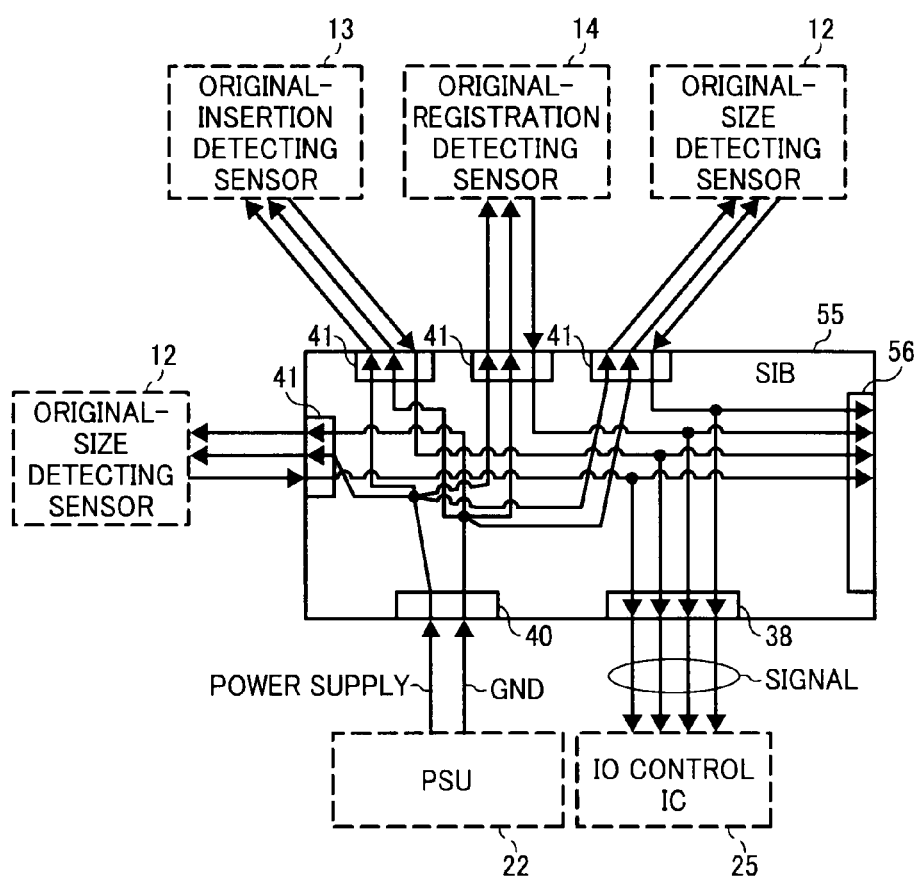
FIG. 15 is a block diagram for explaining flows of signals in the SIB according to the third embodiment when the scanning device and the printing device are integrally arranged.

FIG. 15 is a block diagram for explaining flows of signals in the SIB 55 when the scanning device 52 and the printing device 53 are integrally arranged. A power-supply signal and a GND signal are input from the PSU 22 to the connector 40. The power-supply signal and the GND signal are distributed by the SIB 55, and then output from the connectors 41 to the sensors 12, 13, 14 and the scanner driving unit.

Detected signals from the sensors 12, 13, 14 are input to the connectors 41, and then output as they are (as parallel signals) from the connector 38 to the IO control IC 25. Although not shown, when a control signal (a parallel signal) is to be transmitted from the IO control IC 25 to the scanner driving unit, the control signal is output from the IO control IC 25 to the connector 38, and then output from the connector 38 to the scanner driving unit. The detected signals from the sensors 12, 13, 14 are divided by the SIB 55, and a part of the divided signals is delivered to the SRB interface 56. Furthermore, a signal wire is always connected between the SRB interface 56 and the scanner driving unit.

Thus, the integral arrangement of the scanning device 52 and the printing device 53 can be changed to the separate arrangement simply by connecting the SRB 59 to the SIB 55. In this manner, the integral arrangement of the scanning device 52 and the printing device 53 is automatically changed to the separate arrangement.

Figure 16:
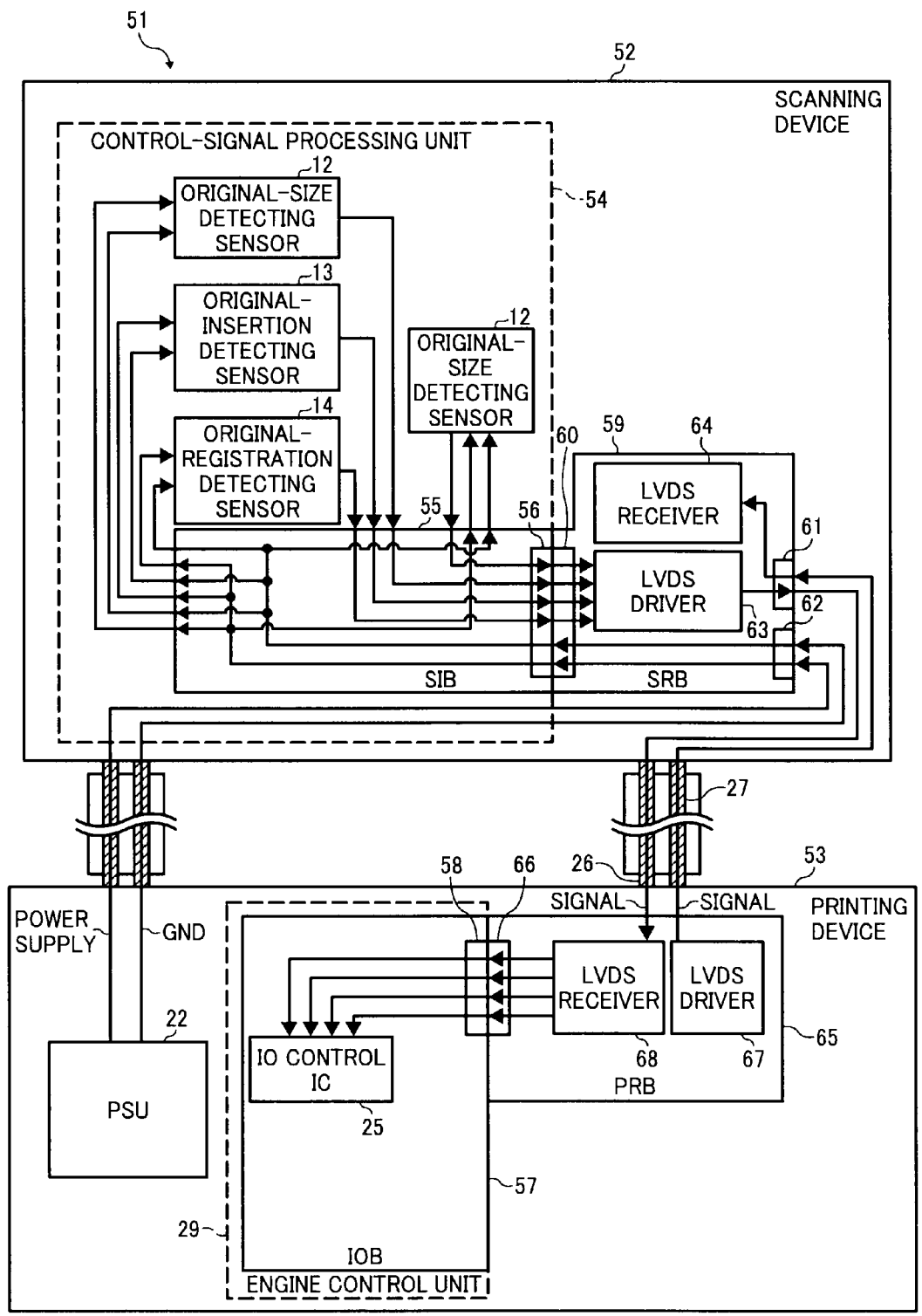
FIG. 16 is a block diagram of the copy machine according to the third embodiment when the scanning device and the printing device are separately arranged.

FIG. 16 is a block diagram of the copy machine 51 when the scanning device 52 and the printing device 53 are separately arranged. For convenience of explanation, only the control-signal processing unit 54, the IOB 57, the PSU 22, the SRB 59, and the PRB 65 are shown in FIG. 16. In the scanning device 52, the SIB 55 is connected to the SRB 59 via the SRB interface 56. The SRB 59 includes an SIB interface 60, a connector 61 for separate arrangement, a power-supply connector 62 for separate arrangement, the LVDS driver 63, and the LVDS receiver 64.

The SIB interface 60 is arranged to connect the SRB 59 with the SIB 55. The connector 61 is connected to the signal wires for the sensors 12, 13, 14 and the scanner driving unit. The power-supply connector 62 is connected to the power-supply wire and the GND wire from the PSU 22. The LVDS driver 63 converts a parallel signal from each of the sensors 12, 13, 14 into a serial signal, and then transmits the serial signal to the LVDS receiver 68 in the PRB 65. The LVDS receiver 64 receives a serial signal from the LVDS driver 67 in the PRB 65, and then converts the received serial signal into a parallel signal. The LVDS receiver 64 then sends the parallel signal to the scanner driving unit.

In the printing device 53, the IOB 57 is connected to the PRB 65 via the PRB interface 58. The PRB 65 includes an IOB interface 66, the LVDS driver 67, and the LVDS receiver 68. The IOB interface 66 is arranged to connect the IOB 57 with the PRB 65. The LVDS driver 67 converts a parallel signal from the IO control IC 25 into a serial signal, and then transmits the serial signal to the LVDS receiver 64. The LVDS receiver 68 converts a serial signal from the LVDS driver 63 into a parallel signal, and then sends the parallel signal to the IO control IC 25.

Thus, a signal (a parallel signal) from each of the sensors 12, 13, 14 is converted into a serial signal by the LVDS driver 63, and then transmitted to the LVDS receiver 68 via the harness 26. The serial signal is converted into a parallel signal by the LVDS receiver 68, and then sent to the IO control IC 25.

When a signal (a parallel signal) (not shown) is to be transmitted from the IO control IC 25 to the scanner driving unit, the parallel signal is converted into a serial signal by the LVDS driver 67, and then transmitted to the LVDS receiver 64 via the harness 26 that is covered with the shield 27. The serial signal is converted into a parallel signal by the LVDS receiver 64, and then sent to the scanner driving unit.

Figure 17:
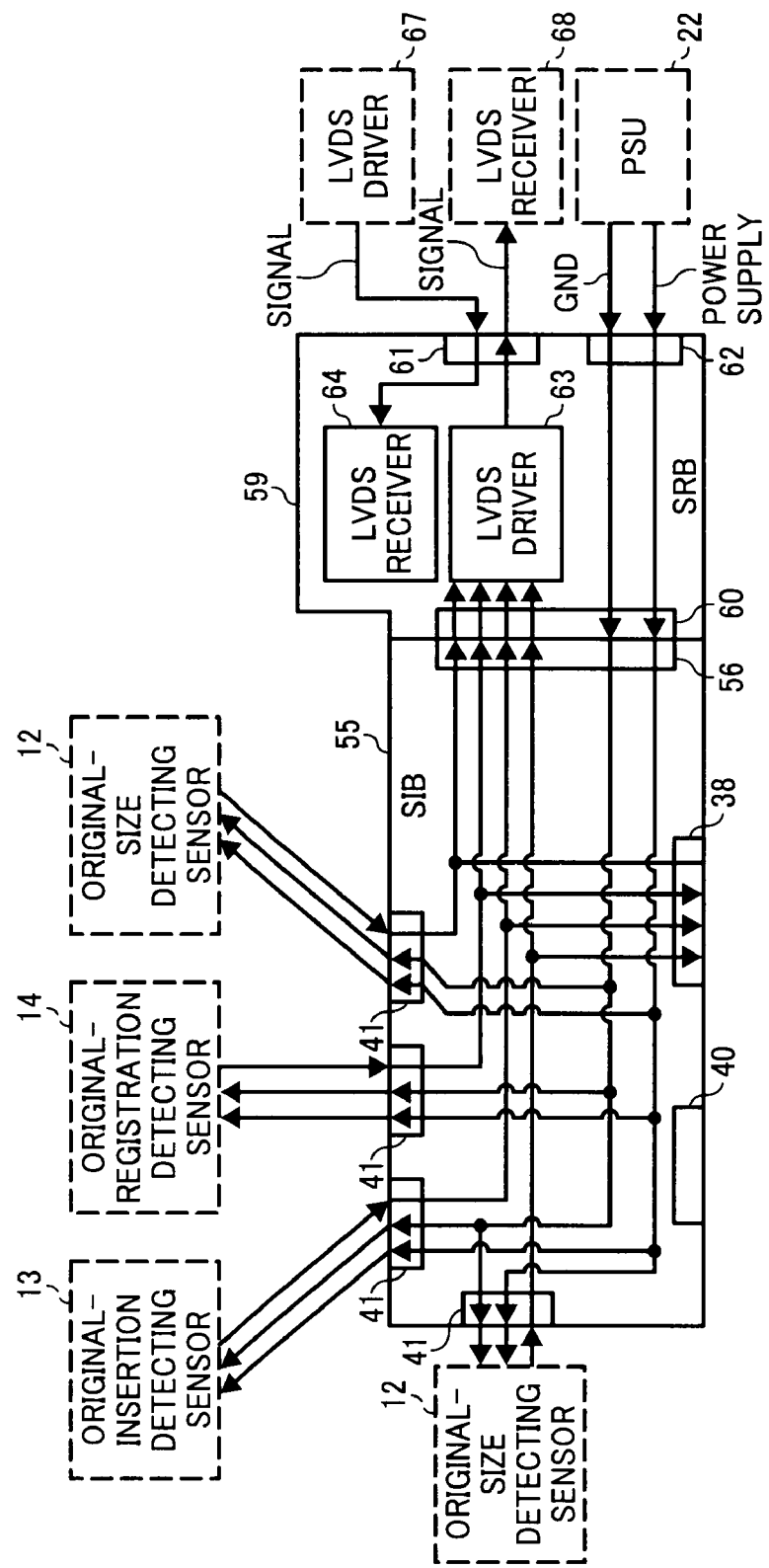
FIG. 17 is a block diagram for explaining flows of signals in the SIB and an SRB according to the third embodiment when the scanning device and the printing device are separately arranged.

FIG. 17 is a block diagram for explaining flows of signals in the SIB 55 and the SRB 59 when the scanning device 52 and the printing device 53 are separately arranged. A power-supply signal and a GND signal from the PSU 22 are input to the power-supply connector 62, and then sent to the SIB 55 via the SRB interface 56. The power-supply signal and the GND signal are distributed by the SIB 55, and then output to the sensors 12, 13, 14 and the scanner driving unit from the connectors 41.

A detected signal (a parallel signal) from each of the sensors 12, 13, 14 is input to the connector 41, and then output from the connector 41 to the LVDS driver 63 via the SRB interface 56 and the SIB interface 60. The detected signal is converted into a serial signal by the LVDS driver 63, and then output from the LVDS driver 63 to the LVDS receiver 68 via the connector 61.

When a control signal (a serial signal) is to be transmitted from the LVDS driver 67 to the scanner driving unit, the control signal is input to the connector 61 from the LVDS driver 67. The control signal is then converted into a parallel signal by the LVDS receiver 64. The parallel signal is input to the SIB 55 via the SRB interface 56, and then output from the SIB 55 to the scanner driving unit.

Detected signals from the sensors 12, 13, 14 are divided by the SIB 55, and a part of the divided signals is delivered to the connector 38. Although not shown, a signal wire is always connected between the connector 38 and the scanner driving unit. Thus, the separate arrangement of the scanning device 52 and the printing device 53 can be changed to the integrate arrangement simply by detaching the SRB 59 from the SIB 55. In this manner, the separate arrangement of the scanning device 52 and the printing device 53 can be automatically changed to the integral arrangement.

In the third embodiment, when the scanning device 52 and the printing device 53 are separately arranged, the power-supply wire and the GND wire from the PSU 22 is connected to the power-supply connector 62. However, it can be configured such that the power-supply wire and the GND wire are connected to the connector 40 in the same manner as when the scanning device 52 and the printing device 53 are integrally arranged. In such a case, the SRB 59 does not need to include the power-supply connector 62.

In an image forming apparatus according to the third embodiment as described above, when the scanning device 52 and the printing device 53 are integrally arranged, the scanning device 52 and the printing device 53 transmit/receive a normal signal to/from each other. On the other hand, when the scanning device 52 and the printing device 53 are separately arranged, the SIB 55 is connected to the SRB 59, and the IOB 57 is connected to the PRB 65. A normal signal is converted into a low voltage differential signal by the LVDS drivers 63, 67, and the low voltage differential signal is transmitted between the scanning device 52 and the printing device 53. When the low voltage differential signal is received by the scanning device 52 or the printing device 53, the low voltage differential signal is converted into a normal signal by the LVDS receiver 64 or 68. The normal signal is then sent to each unit in the scanning device 52 or the printing device 53. With this configuration, when the scanning device 52 and the printing device 53 are integrally arranged, it is not necessary to arrange the SRB 59 and the PRB 65. Thus, it is possible to reduce costs of the image forming apparatus.

In the second embodiment, each of the scanning device and the printing device includes the LVDS driver and the LVDS receiver. However, in a fourth embodiment of the present invention, when a scanning device 72 and a printing device 73 are separately arranged, two relay substrates 80 each including an LVDS driver 69 and an LVDS receiver 70 are connected between the scanning device 72 and the printing device 73. Thus, a signal is transmitted between the LVDS driver 69 and the LVDS receiver 70. In the fourth embodiment, description on components of a copy machine 71, except for the same components as those of the copy machine 1, is explained.

Figure 18:
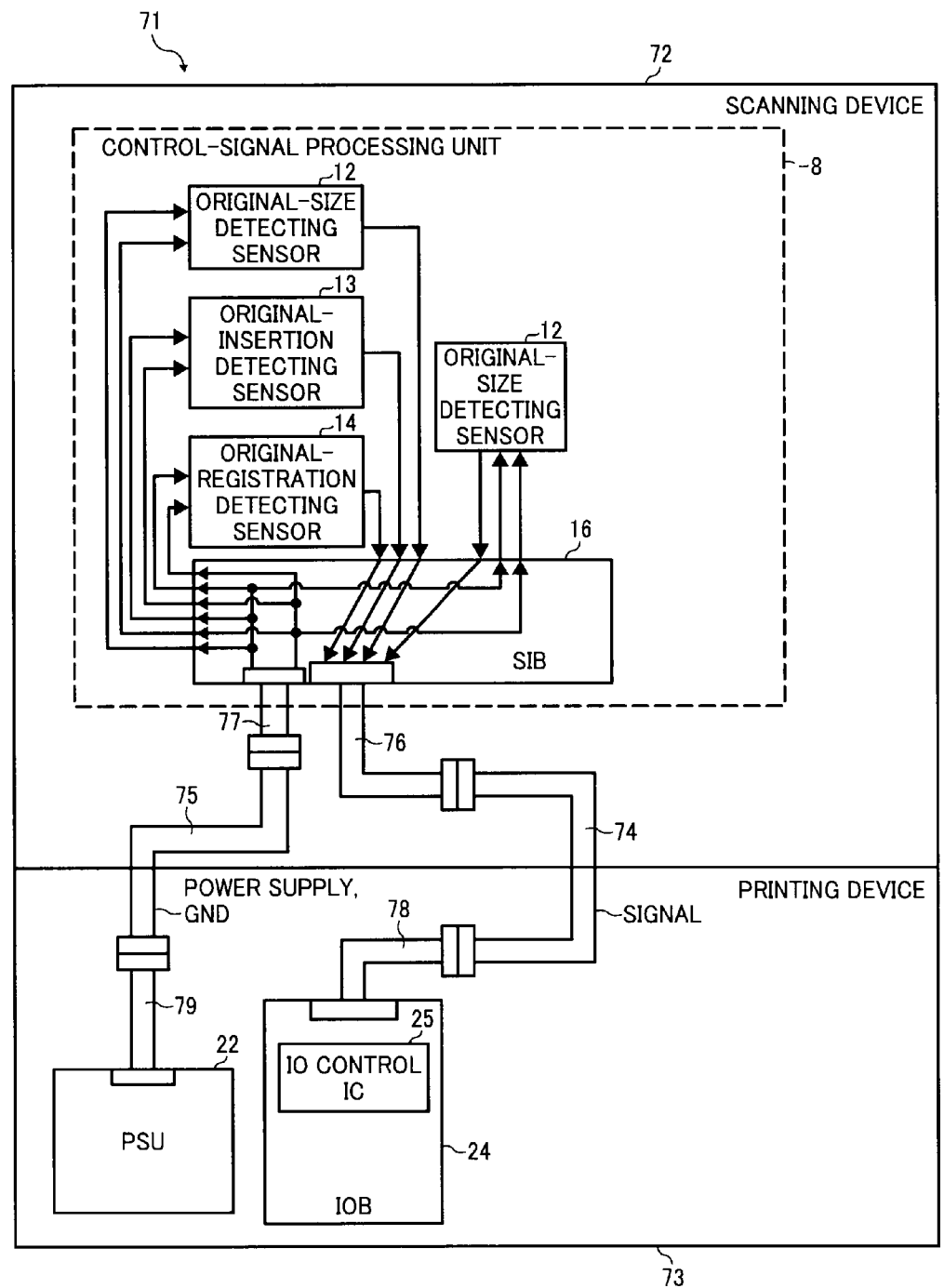
FIG. 18 is a block diagram of a copy machine according to a fourth embodiment of the present invention when a scanning device and a printing device are integrally arranged.

FIG. 18 is a block diagram of the copy machine 71. The image-signal processing unit 7, the IPU 18, the Ctrl 19, the VDB 20, the LPH 21, and the BCU 23 are not shown in FIG. 18, because the configurations of those are the same as those in the first embodiment.

The copy machine 71 includes the scanning device 72, the printing device 73, and copy-machine relay cords 74, 75. Although the scanning device 72 and the printing device 73 are integrally arranged in FIG. 18, the scanning device 72 and the printing device 73 can be separately arranged depending on a request from a user.

The scanning device 72 includes the image-signal processing unit 7, the control-signal processing unit 8, and relay cords 76, 77.

The relay cord 76 includes a harness and a connector. The relay cord 76 is connected to the signal wires for the sensors 12, 13, 14 and the scanner driving unit in the SIB 16. The relay cord 77 includes a harness and a connector. The relay cord 77 is connected to the power-supply wire and the GND wire in the SIB 16.

The printing device 73 includes the engine control unit 17, the IPU 18, the Ctrl 19, the VDB 20, the LPH 21, the PSU 22, and relay cords 78, 79.

The relay cord 78 includes a harness and a connector. The relay cord 78 is connected to wires in the IO control IC 25. The relay cord 79 includes a harness and a connector. The relay cord 79 is connected to the power-supply wire and the GND wire in the PSU 22.

The relay cord 74 includes a harness and a connector. The relay cord 74 connects the relay cord 76 with the relay cord 78. The relay cord 75 includes a harness and a connector. The relay cord 75 connects the relay cord 77 with the relay cord 79. When the scanning device 72 and the printing device 73 are integrally arranged, the relay cord 74 and the relay cord 75 to be used are short relay cords.

When the scanning device 72 and the printing device 73 are integrally arranged, the relay cord 76 is connected to the relay cord 74, and the relay cord 74 is connected to the relay cord 78. Furthermore, the relay cord 77 is connected to the relay cord 75, and the relay cord 75 is connected to the relay cord 79. In this manner, the scanning device 72 is connected to the printing device 73.

Figure 19:
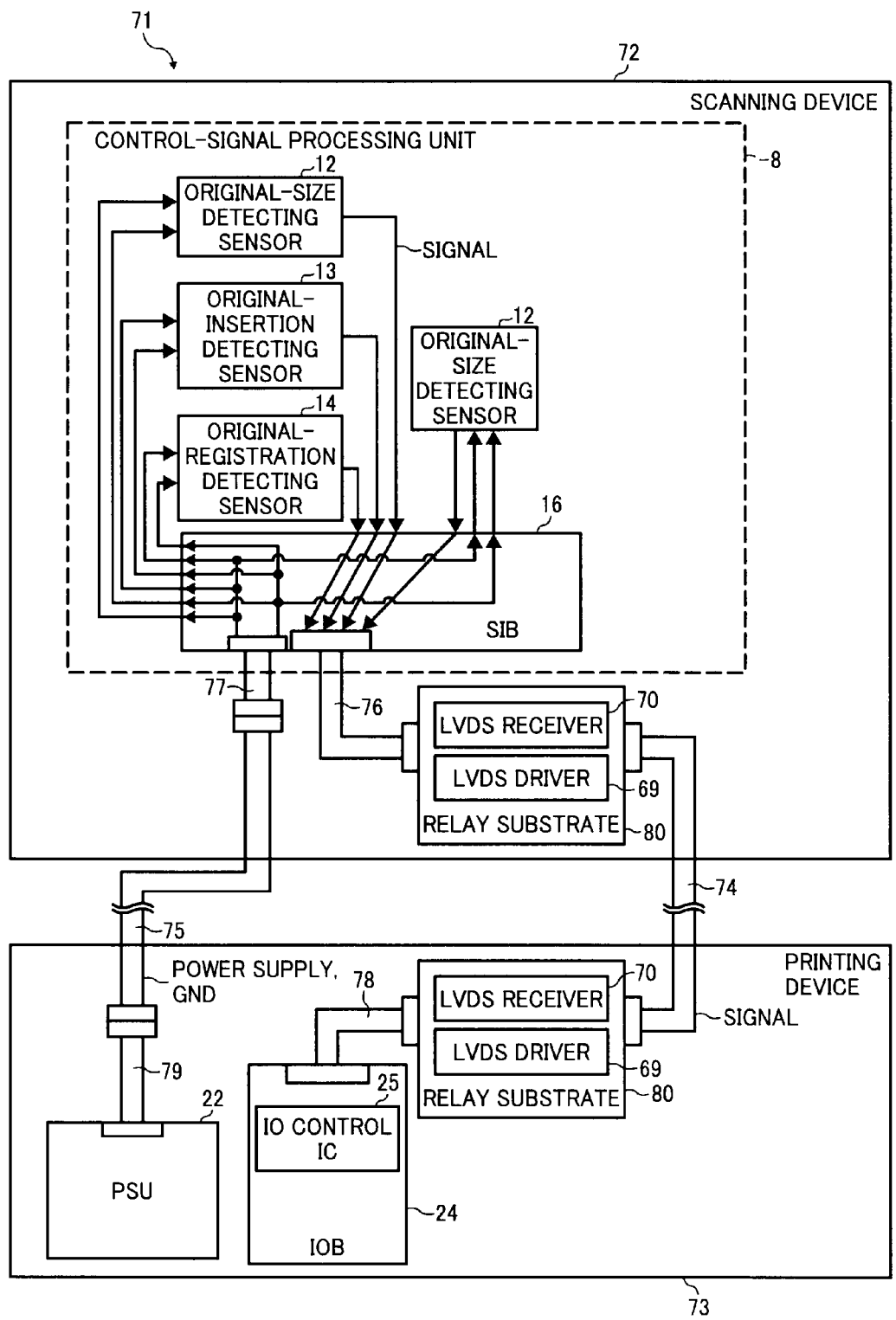
FIG. 19 is a block diagram of the copy machine according to the fourth embodiment when the scanning device and the printing device are separately arranged.

FIG. 19 is a block diagram of the copy machine 71 when the scanning device 72 and the printing device 73 are separately arranged. For convenience of explanation, only the control-signal processing unit 8, the IOB 24, the PSU 22, and the relay cords 74, 75, 76, 77, 78, 79 are shown in FIG. 19. When the scanning device 72 and the printing device 73 are separately arranged, the relay cords 74, 75 to be used are long relay cords.

In a case the scanning device 72 and the printing device 73 are located far from each other, if there are quality deterioration of signals transmitted between the scanning device 72 and the printing device 73 and instability of operation, the relay substrate 80 is connected between the relay cord 76 and the relay cord 74, and between the relay cord 78 and the relay cord 74. The relay substrate 80 includes the LVDS driver 69 and the LVDS receiver 70. The LVDS driver 69 and the LVDS receiver 70 performs serial-to-parallel conversion and parallel-to-serial conversion of signals in the manner as described in the second embodiment, so that a signal can be transmitted using differential-type serial data that allows long distance transmission with low quality deterioration of signals. Thus, it is possible to achieve flexible arrangement of the copy machine 71.

In a case the scanning device 72 and the printing device 73 are located close to each other, if there are hardly any quality deterioration of signals transmitted between the scanning device 72 and the printing device 73, the relay substrate 80 is not connected between the relay cord 76 and the relay cord 74 and between the relay cord 78 and the relay cord 74. Specifically, the relay cord 76 is connected to the relay cord 74, and the relay cord 74 is connected to the relay cord 78. Therefore, if the relay substrate 80 is not used, costs of the copy machine 71 can be reduced.

In an image forming apparatus according to the fourth embodiment, when the scanning device 72 and the printing device 73 are integrally arranged, a normal signal is transmitted between the scanning device 72 and the printing device 73 via harnesses. When the scanning device 72 and the printing device 73 are separately arranged, the relay substrate 80 is connected to each of the SIB 16 and the printing device via the harness. Thus, a low voltage differential signal is transmitted between the relay substrates 80 via the harnesses. When the scanning device 72 and the printing device 73 are integrally arranged, the relay substrate 80 needs not be arranged in the copy machine 71. Thus, it is possible to reduce costs of the image forming apparatus.

In a fifth embodiment of the present invention, description on components of a copy machine 81, except for the same components as those of the copy machine 1, is explained.

Figure 20:
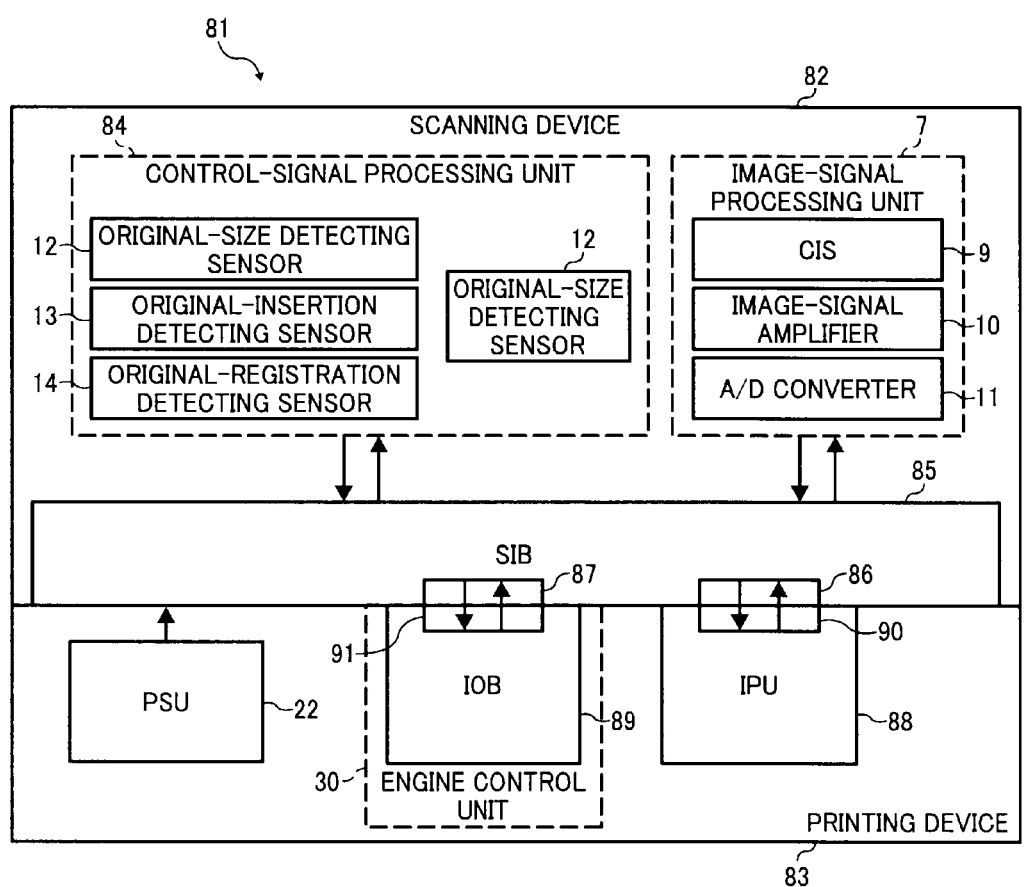
FIG. 20 is a block diagram of the copy machine according to a fifth embodiment of the present invention when a scanning device and a printing device are integrally arranged.

FIG. 20 is a block diagram of the copy machine 81 when a scanning device 82 and a printing device 83 are integrally arranged. The Ctrl 19, the VDB 20, the LPH 21, and the BCU 23 are not shown in FIG. 20, because the configurations of those are the same as those in the first embodiment. Flows of signals and electric power are shown in FIG. 20 in a simplified manner. For example, although one arrow is shown, it can mean that several kinds of signals and electric power flow in a direction indicated by the arrow.

The copy machine 81 includes the scanning device 82 and the printing device 83. Although the scanning device 82 and the printing device 83 are integrally arranged in FIG. 20, the scanning device 82 and the printing device 83 can be separately arranged depending on a request from a user.

The scanning device 82 includes the image-signal processing unit 7, a control-signal processing unit 84, and an SIB 85. The control-signal processing unit 84 includes the two original-size detecting sensors 12, the original-insertion detecting sensor 13, the original-registration detecting sensor 14, and the scanner driving unit.

The SIB 85 transmits/receives a signal to/from an IPU 88 and an IOB 89 in the printing device 83. The SIB 85 also receives electric power from the PSU 22. In the copy machine 1 according to the first embodiment, the SIB 16 is included in the control-signal processing unit 8. The SIB 16 does not transmit/receive a signal to/from the image-signal processing unit 7, or supply the electric power to the image-signal processing unit 7. Instead, in the copy machine 81, the SIB 85 is independent from the control-signal processing unit 84. The SIB 85 transmits/receives a signal to/from the image-signal processing unit 7, and supplies the electric power to the image-signal processing unit 7.

The SIB 85 includes an IPU connector 86 and an IOB connector 87. The IPU connector 86 is connected to an IPU connector 90 that is included in the IPU 88. The IOB connector 87 is connected to an IOB connector 91 that is included in the IOB 89.

The printing device 83 includes an engine control unit 30, the IPU 88, the Ctrl 19, the VDB 20, the LPH 21, and the PSU 22. The engine control unit 30 includes the BCU 23 and the IOB 89.

The IPU 88 includes the IPU connector 90. The IPU connector 90 is connected to the IPU connector 86. The IOB 89 includes the IO control IC 25 and the IOB connector 91. The IOB connector 91 is connected to the IOB connector 87.

Electric power is supplied from the PSU 22 to the SIB 85. The electric power is then divided by the SIB 85, and the divided electric power is supplied to each of the image-signal processing unit 7 and the control-signal processing unit 84. A signal is transmitted between the image-signal processing unit 7 and the IPU 88 via the IPU connector 86 and the IPU connector 90. Furthermore, another signal is transmitted between the control-signal processing unit 84 and the IOB 89 via the IOB connector 87 and the IOB connector 91.

The IPU connector 86 and the IPU connector 90 are connectable to each other, and the IOB connector 87 and the IOB connector 91 are connectable to each other. Therefore, the separate arrangement of the copy machine 81 can be changed to the integral arrangement simply by connecting the IPU connector 86 to the IPU connector 90 and the IOB connector 87 to the IOB connector 91. In this manner, the scanning device 82 and the printing device 83 can be integrally arranged.

Figure 21:
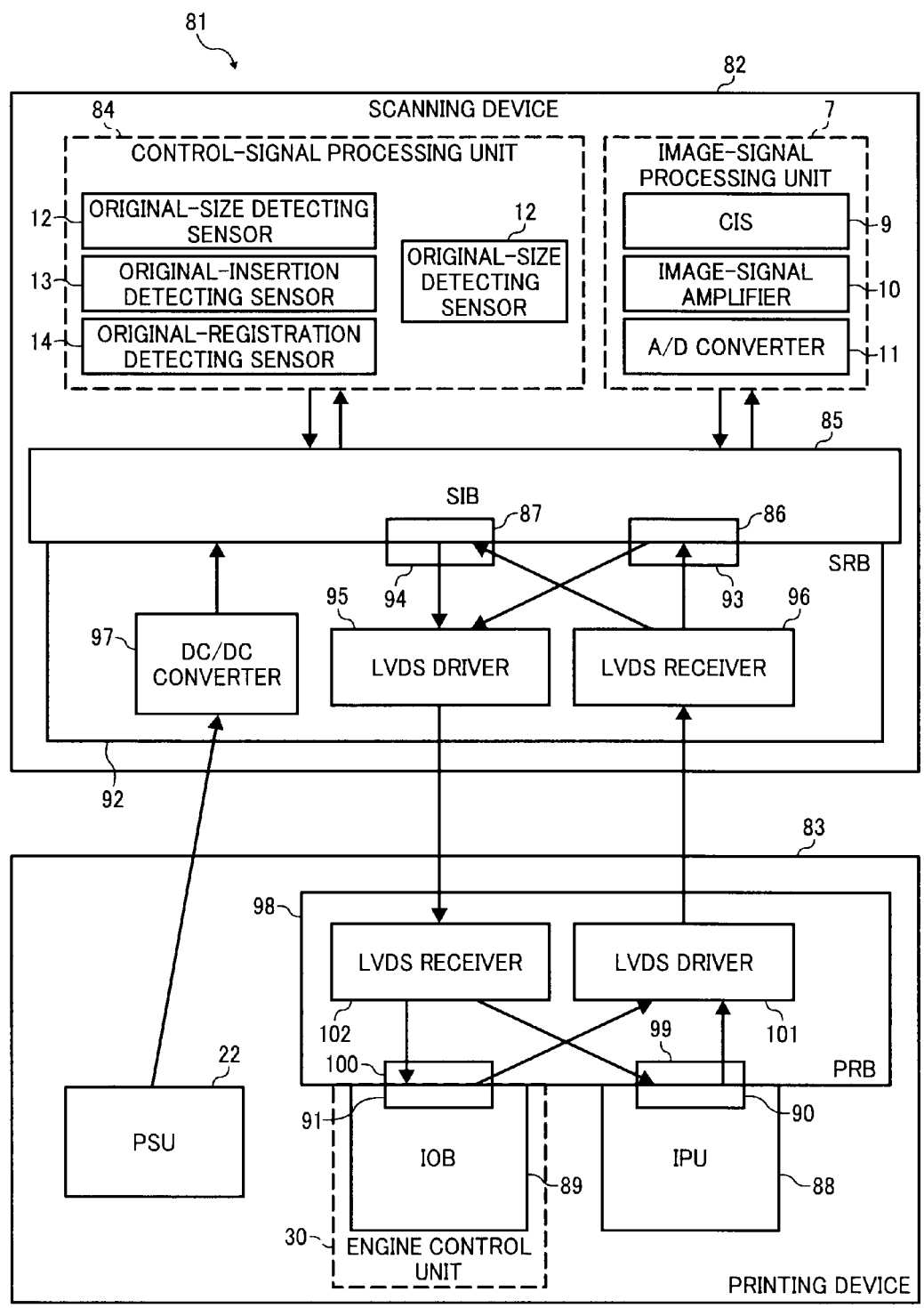
FIG. 21 is a block diagram of the copy machine according to the fifth embodiment when the scanning device and the printing device are separately arranged.

FIG. 21 is a block diagram of the copy machine 81 when the scanning device 82 and the printing device 83 are separately arranged. The SIB 85 is connected to an SRB 92 via the IPU connector 86 and the IOB connector 87. The SRB 92 includes SIB connectors 93, 94, an LVDS driver 95, an LVDS receiver 96, and a DC/DC converter 97.

The SIB connector 93 is connected to the IPU connector 86, and the SIB connector 94 is connected to the IOB connector 87. The LVDS driver 95 receives a parallel signal from the SIB 85, and then converts the received parallel signal into a serial signal. The LVDS receiver 96 receives a serial signal from an LVDS driver 101 in a PRB 98, and then converts the received serial signal into a parallel signal. The DC/DC converter 97 receives electric power from the PSU 22, and then converts a voltage of the received electric power into a level that is required for the scanning device 82.

The PSU 22 supplies the electric power to the scanning device 82 via the harness between the printing device 83 and the scanning device 82. Therefore, if the printing device 83 and the scanning device 82 are located far from each other, voltage drop due to resistance of the harness needs to be considered.

For example, when the electric power is supplied from the PSU 22 to the scanning device 82 with a voltage of five volts (plus or minus five percent), if a consumption current of a 5-volt system of the scanning device 82 is five ampere, a resistance of the harness needs to be less than 0.5 ohm, so that the voltage drop is less than minus five percent. If the consumption current becomes larger, tolerance of the resistance of the harness needs to be smaller. If a distance between the scanning device 82 and the printing device 83 is long, it is difficult to set the resistance of the harness within the tolerance. If a voltage applied to the scanning device 82 is lower than the tolerance, an operation failure of the scanning device 82 may occur.

One countermeasure for the above is to configure the scanning device 82 to include a power-supply unit. In such a case, when the scanning device 82 and the printing device 83 are separately arranged, the power-supply unit directly supplies the electric power to the scanning device 82. However, with this configuration, each of the scanning device 82 and the printing device 83 needs to be arranged near an outlet for a commercial power supply. Therefore, the scanning device 82 and the printing device 83 cannot be arranged in an area where there is no outlet for the commercial power supply nearby. Furthermore, because two power cords need to be arranged for the scanning device 82 and the printing device 83, the power cords may cause troubles for a user or degrades appearance of the devices. Moreover, because the power-supply unit needs to be additionally arranged in the scanning device 82, a size of the scanning device 82 increases, and costs of the scanning device 82 increases.

In the copy machine 81, the SRB 92 includes the DC/DC converter 97. When the scanning device 82 and the printing device 83 are separately arranged, the DC/DC converter 97 receives electric power from the PSU 22, and then converts a voltage of the received electric power into a level that is required for the scanning device 82. Afterward, the DC/DC converter 97 feeds the electric power to the SIB 85. Thus, even if the scanning device 82 does not include an additional power-supply unit, the scanning device 82 and the printing device 83 can be separately arranged in a flexible manner without considering a distance between the scanning device 82 and the printing device 83 (the resistance of the harness connected between the scanning device 82 and the printing device 83).

The IPU 88 and the IOB 89 are connected to the PRB 98 via the IPU connector 90 and the IOB connector 91. The PRB 98 includes an IPU connector 99, an IOB connector 100, the LVDS driver 101, and an LVDS receiver 102. The IPU connector 99 is connected to the IPU connector 90, and the IOB connector 100 is connected to the IOB connector 91. The LVDS driver 101 receives a parallel signal from each of the IPU 88 and the IOB 89, and then converts the received parallel signal into a serial signal. The LVDS receiver 102 receives a serial signal from the LVDS driver 95, and then converts the received serial signal into a parallel signal. A harness (not shown) is connected between the LVDS driver 95 and the LVDS receiver 102 and between the LVDS driver 101 and the LVDS receiver 96 to transmit a serial signal to one another.

The electric power is supplied from the PSU 22 to the SRB 92. Afterward, the DC/DC converter 97 converts a voltage of the electric power into a desired level. The DC/DC converter 97 then supplies the electric power to the image-signal processing unit 7 and the control-signal processing unit 84 via the SIB 85.

When the image-signal processing unit 7 is to transmit a signal to the IPU 88, the image-signal processing unit 7 sends the signal to the SIB 85, and then the SIB 85 sends the signal to the LVDS driver 95 via the IPU connector 86 and the SIB connector 93. The LVDS driver 95 receives the signal (parallel signal), and then converts the parallel signal into a serial signal. The LVDS driver 95 transmits the serial signal to the LVDS receiver 102 via a harness (not shown). The LVDS receiver 102 converts the serial signal into a parallel signal. The LVDS receiver 102 then sends the parallel signal to the IPU 88 via the IPU connector 99 and the IPU connector 90.

When the IPU 88 is to transmit a signal to the image-signal processing unit 7, the IPU 88 sends the signal to the LVDS driver 101 via the IPU connector 90 and the IPU connector 99. The LVDS driver 101 then converts the signal (parallel signal) into a serial signal. The LVDS driver 101 transmits the serial signal to the LVDS receiver 96 via a harness (not shown). The LVDS receiver 96 then converts the serial signal into a parallel signal. The LVDS receiver 96 sends the parallel signal to the SIB 85 via the SIB connector 93 and the IPU connector 86. The SIB 85 then sends the parallel signal to the image-signal processing unit 7.

When the control-signal processing unit 84 is to transmit a signal to the IOB 89, the control-signal processing unit 84 sends the signal to the SIB 85. The SIB 85 then sends the signal to the LVDS driver 95 via the IOB connector 87 and the SIB connector 94. The LVDS driver 95 converts the signal (parallel signal) into a serial signal. The LVDS driver 95 then transmits the serial signal to the LVDS receiver 102 via a harness (not shown). The LVDS receiver 102 converts the serial signal into a parallel signal. The LVDS receiver 102 sends the parallel signal to the IOB 89 via the IOB connector 100 and the IOB connector 91.

When the IOB 89 is to transmit a signal to the control-signal processing unit 84, the IOB 89 sends the signal to the LVDS driver 101 via the IOB connector 91 and the IOB connector 100. The LVDS driver 101 converts the signal (parallel signal) into a serial signal. The LVDS driver 101 then transmits the serial signal to the LVDS receiver 96 via a harness (not shown). The LVDS receiver 96 converts the serial signal into a parallel signal. The LVDS receiver 96 sends the parallel signal to the SIB 85 via the SIB connector 94 and the IOB connector 87. The SIB 85 then sends the parallel signal to the control-signal processing unit 84.

In this state, the integral arrangement of the copy machine 81 can be changed to the separate arrangement by disconnecting the IPU connector 86 from the IPU connector 90, and disconnecting the IOB connector 87 from the IOB connector 91. Thus, the scanning device 82 is physically detached from the printing device 83.

According to configurations, the IPU connector 86 is connectable to the SIB connector 93, and the IOB connector 87 is connectable to the SIB connector 94. Therefore, the SRB 92 can be connected to the SIB 85 when the IPU connector 86 and the IOB connector 87 are simply connected to the SIB connector 93 and the SIB connector 94, respectively. Furthermore, according to configurations, the IPU connector 90 is connectable to the IPU connector 99, and the IOB connector 91 is connectable to the IOB connector 100. Therefore, the PRB 98 can be connected to the IPU 88 and the IOB 89 when the IPU connector 90 and the IOB connector 91 are simply connected to the IPU connector 99 and the IOB connector 100, respectively. Thus, the integral arrangement of the scanning device 82 and the printing device 83 can be changed to the separate arrangement in an easy manner.

Figure 22:
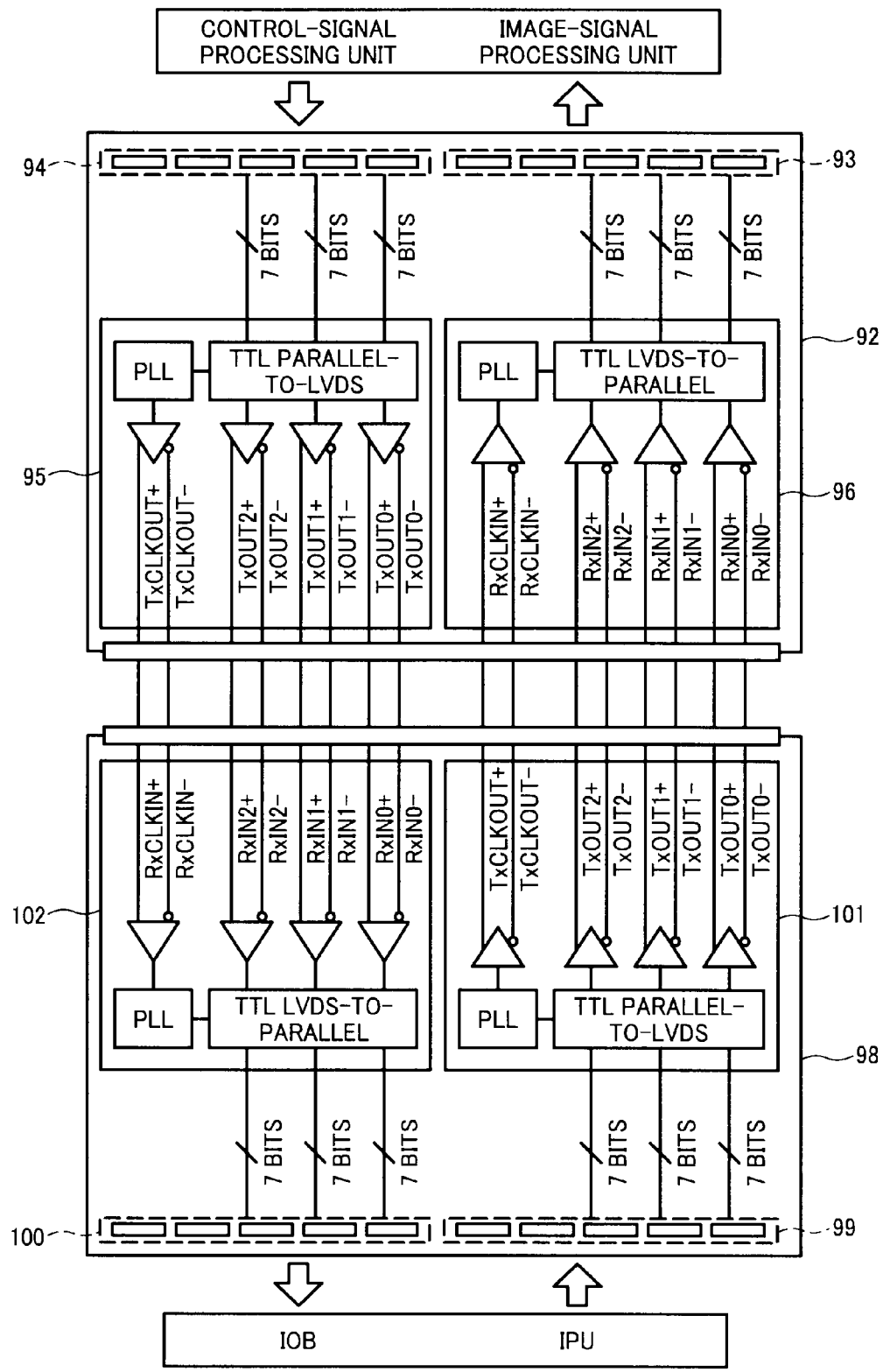
FIG. 22 is a schematic diagram of an example of data transmission between LVDS drivers and LVDS receivers included in the copy machine according to the fifth embodiment.
Figure 23:
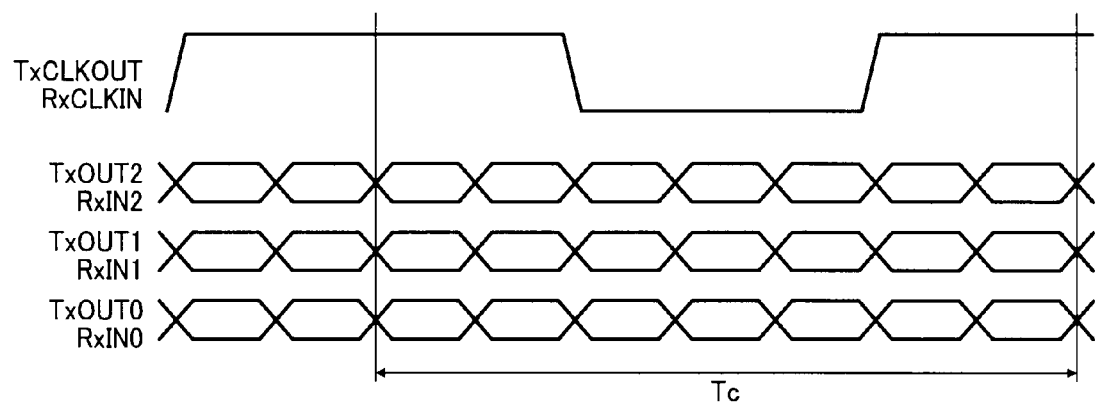
FIG. 23 is a schematic diagram of an example of timing of the data transmission.

FIG. 22 is a schematic diagram of an example of data transmission between the LVDS driver 95 and the LVDS receiver 102, and between the LVDS driver 101 and the LVDS receiver 96. FIG. 23 is a schematic diagram of an example of timing of the data transmission. A time axis runs horizontally. Reference letters TxCLKOUT denote a clock output signal output from the LVDS driver 95 and the LVDS driver 101. Reference letters RxCLKIN denote a clock input signal input to the LVDS receiver 96 and the LVDS receiver 102. Thus, output signals from the LVDS driver 95 and the LVDS driver 101 are input to the LVDS receiver 96 and the LVDS receiver 102. Reference letters TxOUT2, TxOUT1, and TxOUT0 denote output signals from the LVDS driver 95 and the LVDS driver 101. Reference letters RxIN2, RxIN1, and RxIN0 denote input signals to the LVDS receiver 96 and the LVDS receiver 102. Thus, output signals from the LVDS driver 95 and the LVDS driver 101 are input to the LVDS receiver 96 and the LVDS receiver 102.

Data input to each of the LVDS driver 95 and the LVDS driver 101, i.e., signals of 21 bits, is sampled at each cycle that starts at a leading edge of a transmission clock. The signals are converted into low voltage differential signals in three channels by an internal phase locked loop (PLL) circuit and a transistor-transistor logic (TTL) PARALLEL-TO-LVDS converter circuit included in each of the LVDS driver 95 and the LVDS driver 101. The signals are then output from the LVDS driver 95 and the LVDS driver 101. As shown in FIG. 23, data containing 7 bits is output from each one of the three channels during one cycle (Tc). That is, data containing 21 bits is output from the three channels during one cycle (Tc). When the low voltage differential signals are transmitted in the three channels from the LVDS driver 95 and the LVDS driver 101 to the LVDS receiver 102 and the LVDS receiver 96, the low voltage differential signals are converted into parallel signals by a TTL LVDS-TO-PARALLEL converter circuit included in each of the LVDS receiver 102 and the LVDS receiver 96. In the embodiment, DS90C363/F364 manufactured by National Semiconductor Corporation is used as the LVDS driver 95, the LVDS driver 101, the LVDS receiver 96, and the LVDS receiver 102.

In the embodiments described above, the harness is connected between the LVDS driver 95 and the LVDS receiver 102 and between the LVDS driver 101 and the LVDS receiver 96 to transmit a serial signal to one another. However, it is difficult to prevent radiation of electric waves if the LVDS drivers 95, 101 are connected to the LVDS receivers 96, 102 via the harness. Even in a case a transmission system based on the low voltage differential signal is employed, if a transmission distance is long, signals can be deteriorated due to skew or jitter. To solve the problem described above, a low voltage differential signal, i.e., an electric signal, is converted into an optical signal, and the optical signal is transmitted via an optical transmission path. In this manner, it is possible to prevent radiation of electric waves, or deterioration of signals due to a transmission distance.

Figure 24:
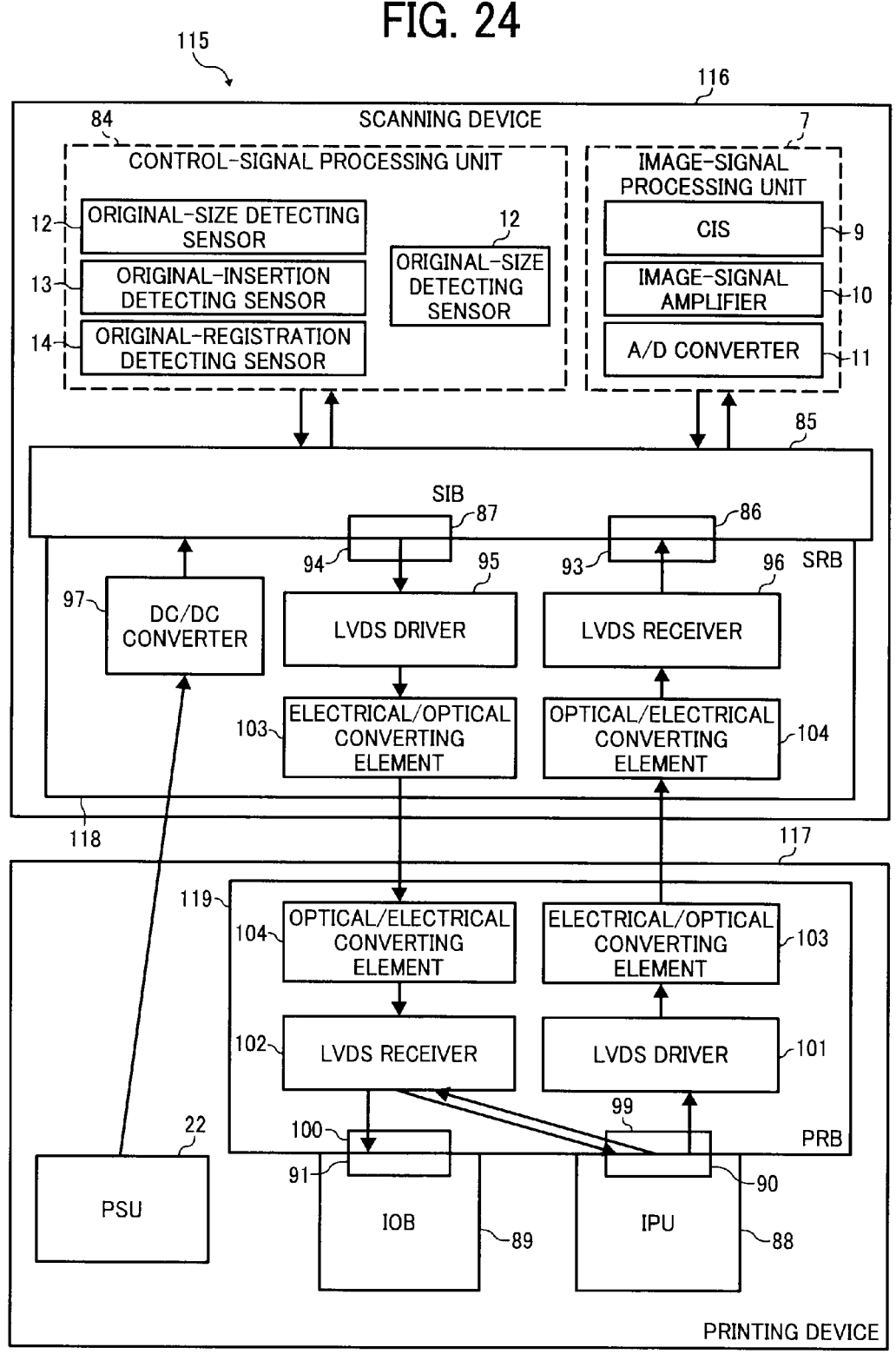
FIG. 24 is a block diagram of a copy machine according to a first modification of the fifth embodiment.

FIG. 24 is a block diagram of a copy machine 115 according to a first modification of the fifth embodiment when a scanning device 116 and a printing device 117 are separately arranged. An SRB 118 includes an electrical/optical converting element 103 and an optical/electrical converting element 104. The electrical/optical converting element 103 converts an electric signal into an optical signal. The optical/electrical converting element 104 converts an optical signal into an electric signal. A PRB 119 also includes the electrical/optical converting element 103 and the optical/electrical converting element 104. Serial signals to be transmitted between the LVDS driver 95 and the LVDS receiver 102 and between the LVDS driver 101 and the LVDS receiver 96 are converted into optical signals. An optical transmission path, i.e., an optical transmission module (not shown), is connected between the electrical/optical converting element 103 and the optical/electrical converting element 104 to transmit the optical signal to one another. In this manner, it is possible to prevent radiation of electric waves, or deterioration of signals.

Alternatively, a light-emitting element 105 converts the low voltage differential signal, i.e., the electric signal, into a light. A light-receiving element 106 receives the light, and then converts the received light into an electric signal. Such optical communication is performed to prevent undesired radiation of electric waves, or deterioration of signals due to a transmission distance.

Figure 25:
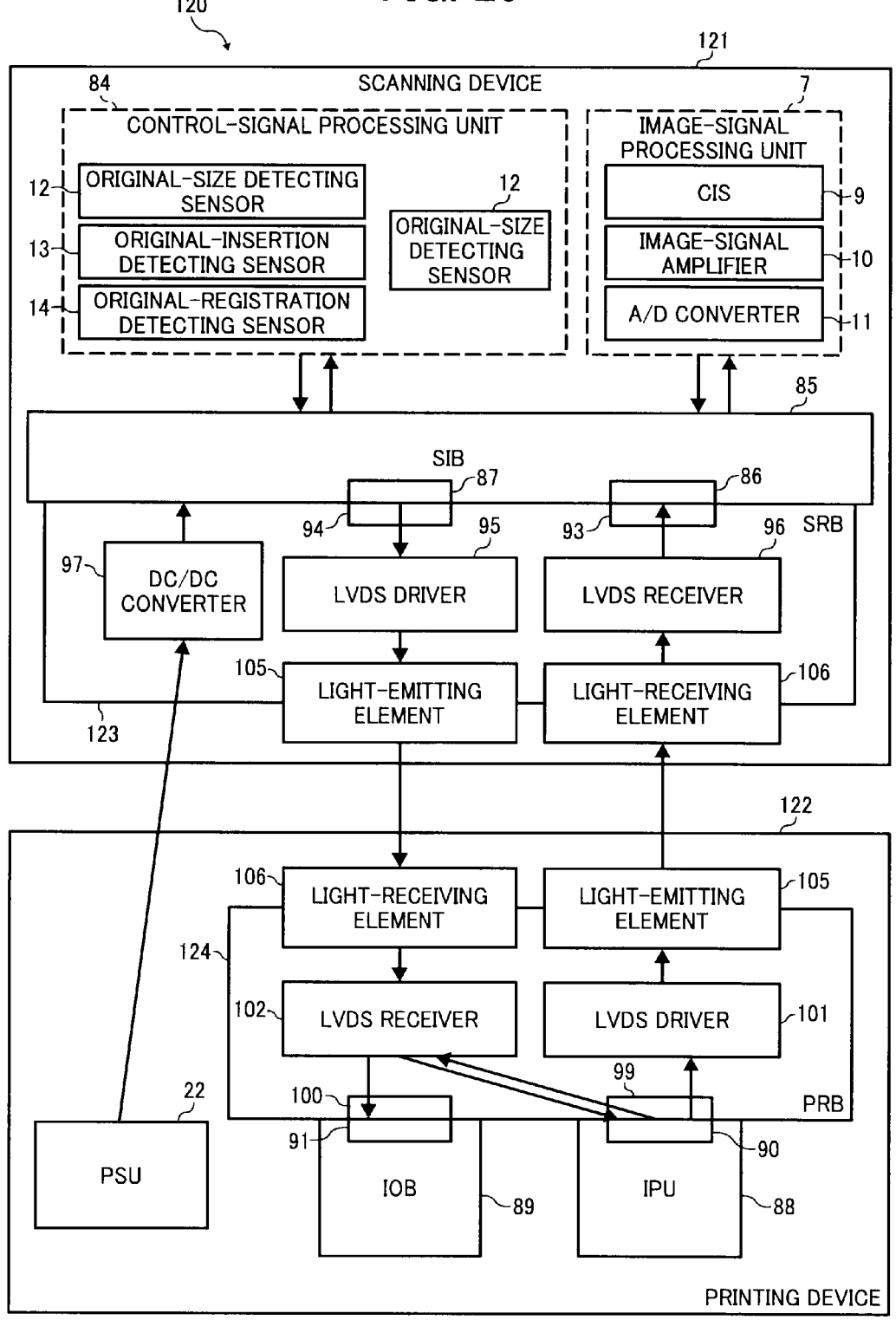
FIG. 25 is a block diagram of a copy machine according to a second modification of the fifth embodiment.

FIG. 25 is a block diagram of a copy machine 120 according to a second modification of the fifth embodiment when a scanning device 121 and a printing device 122 are separately arranged. An SRB 123 includes the light-emitting element 105 and the light-receiving element 106. The light-emitting element 105 emits a light based on a received electric signal. The light-receiving element 106 converts a received light into an electric signal. A PRB 124 also includes the light-emitting element 105 and the light-receiving element 106. Serial signals to be transmitted between the LVDS driver 95 and the LVDS receiver 102 and between the LVDS driver 101 and the LVDS receiver 96 are converted into lights by the light-emitting element 105. When the light-emitting element 105 emits a light, the light-receiving element 106 receives the light, and then converts the received light into a serial signal. In this manner, the signal is transmitted between the LVDS driver 95 and the LVDS receiver 102 and between the LVDS driver 101 and the LVDS receiver 96.

The scanning device 121 and the printing device 122 are arranged in such a manner that the light-emitting elements 105 are faced to the light-receiving elements 106. If the light-emitting element 105 and the light-receiving element 106 cannot be arranged to face to each other, a reflection plate or the like needs to be arranged in an optical path, so that a certain level of light from the light-emitting element 105 is received by the light-receiving element 106. In this manner, it is possible to prevent radiation of electric waves, or deterioration of signals.

Alternatively, a serial signal is transmitted between the LVDS driver 95 and the LVDS receiver 102 and between the LVDS driver 101 and the LVDS receiver 96 via radio communication. Thus, it is possible to prevent undesired radiation of electric waves, or deterioration of signals due to a transmission distance.

Figure 26:
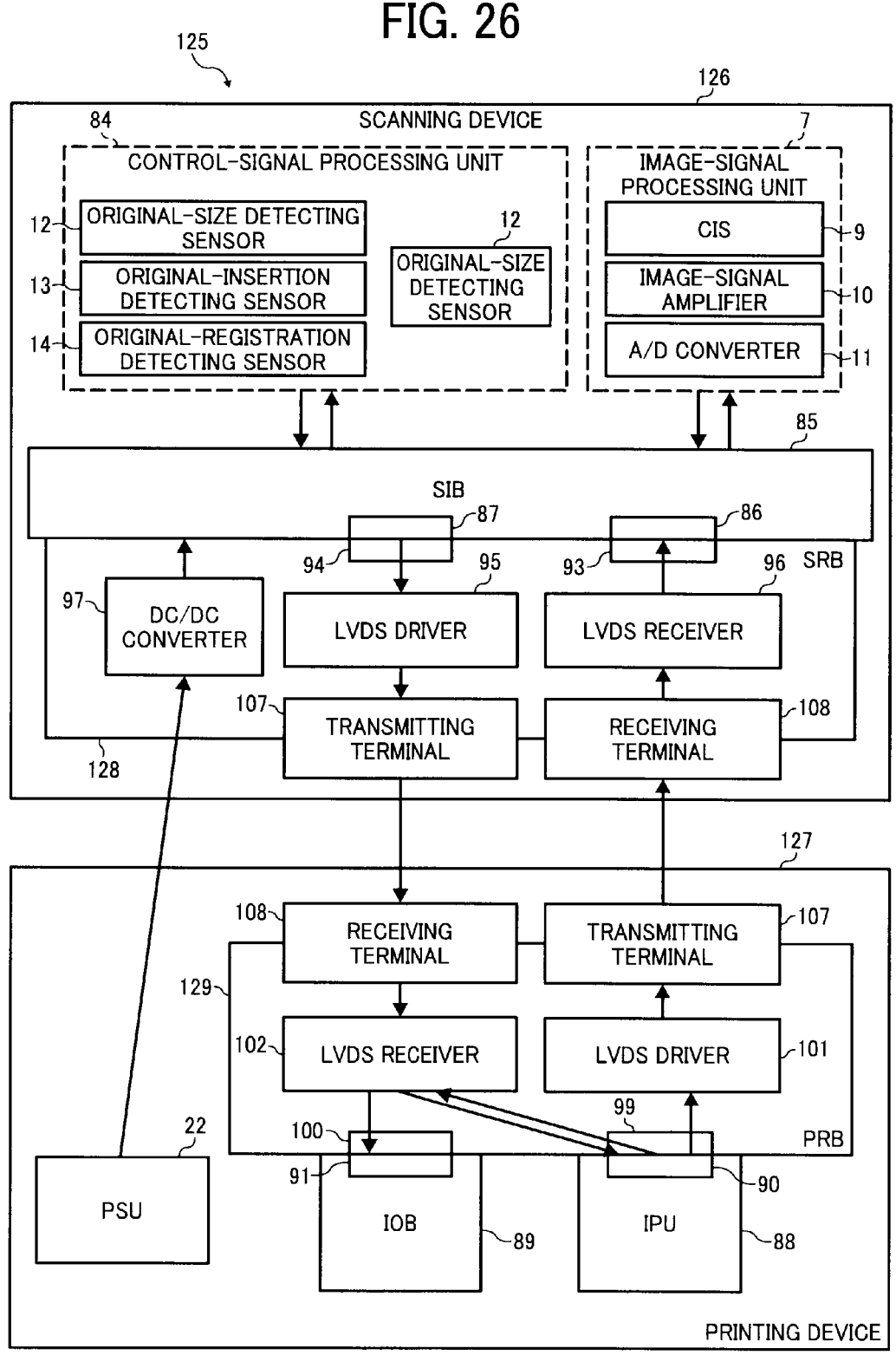
FIG. 26 is a block diagram of a copy machine according to a third modification of the fifth embodiment.

FIG. 26 is a block diagram of a copy machine 125 according to a third modification of the fifth embodiment when a scanning device 126 and a printing device 127 are separately arranged. An SRB 128 includes a transmitting terminal 107 and a receiving terminal 108. The transmitting terminal 107 modulates a signal into a radio signal, and then transmits the radio signal. The receiving terminal 108 receives the radio signal, and then demodulates the received radio signal. A PRB 129 also includes the transmitting terminal 107 and the receiving terminal 108. Serial signals to be transmitted between the LVDS driver 95 and the LVDS receiver 102 and between the LVDS driver 101 and the LVDS receiver 96 are converted into radio signals by the transmitting terminal 107. The radio signals are then transmitted to the receiving terminal 108. The receiving terminal 108 receives the radio signal, and then demodulates the radio signal. In this manner, a signal is transmitted between the LVDS driver 95 and the LVDS receiver 102 and between the LVDS driver 101 and the LVDS receiver 96.

The transmitting terminal 107 in each substrate needs to have a different transmit frequency, so that the receiving terminal 108 receives a radio signal from the transmitting terminal 107 arranged in other substrate, i.e., the receiving terminal 108 does not receive a radio signal from the transmitting terminal 107 arranged in the same substrate as the receiving terminal 108 is arranged.

In an image forming apparatus according to the fifth embodiment, when the scanning device and the printing device are integrally arranged, the electric power from the PSU 22 is directly supplied to the SIB 85. When the scanning device and the printing device are separately arranged, a voltage of the electric power from the PSU 22 is converted by the DC/DC converter 97 that is included in the SRB connected to the SIB 85. The electric power is then supplied from the DC/DC converter 97 to the SIB 85. In this manner, it is possible to prevent an operation failure of the scanning device due to voltage drop.

Furthermore, in the image forming apparatus according to the fifth embodiment, when the scanning device and the printing device are integrally arranged, a signal is transmitted between the scanning device and the printing device via wire communication. When the scanning device and the printing device are separately arranged, a signal is transmitted between the scanning device and the printing device via the optical transmission module, the optical communication, or the radio communication. Thus, it is possible to prevent radiation of electric waves, or deterioration of signals.

According to an aspect of the present invention, the operability can be improved in changing the arrangement of the copy machine between the integral arrangement and the separate arrangement.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising a scanning device and a printing device, wherein the scanning device and the printing device are configured to be separately arranged when the image forming apparatus is in use, wherein
the printing device includes
a control unit that transmits and receives signals to and from a plurality of units included in the scanning device; and
a power supplying unit that supplies electric power to the units, and
the scanning device includes a first relay substrate including at least one first power line and second power lines, of which number of electric lines being greater than that of the at least one first power line, wherein
the scanning device receives electric power from the power supplying unit via the at least one first power line and distributes the electric power to the units via the second power lines, and
relays signals between each of the units and the control unit.

2. The image forming apparatus according to claim 1, further comprising:
a second relay substrate that includes a first signal converting unit that receives a first signal from the control unit, and converts the first signal into a low voltage differential signal, and receives a low voltage differential signal from the scanning device, and converts the low voltage differential signal from the scanning device into a second signal; and a third relay substrate that includes a second signal converting unit that receives a third signal from each of the units in the scanning device, and converts the third signal into a low voltage differential signal, and receives a low voltage differential signal from the printing device, and converts the low voltage differential signal from the printing device into a fourth signal, wherein the control unit is connected to the second relay substrate, and the first relay substrate is connected to the third relay substrate.

3. The image forming apparatus according to claim 2, wherein the third relay substrate further includes a voltage converting unit that receives first electric power from the power supplying unit, and converts a voltage of the first electric power to produce second electric power, and supplies the second electric power to the first relay substrate.

4. The image forming apparatus according to claim 3, wherein a signal is transmitted between the second relay substrate and the third relay substrate via a harness connected between the second relay substrate and the third relay substrate.

5. The image forming apparatus according to claim 3, wherein the second relay substrate further includes a first electrical/optical converting element that converts a low voltage differential signal into an optical signal; and a first optical/electrical converting element that converts an optical signal into a low voltage differential signal, and the third relay substrate further includes a second electrical/optical converting element that converts a low voltage differential signal into an optical signal; and a second optical/electrical converting element that converts an optical signal into a low voltage differential signal, wherein a signal is transmitted between the second relay substrate and the third relay substrate via an optical transmission module connected between the first electrical/optical converting element and the second optical/electrical converting element, and an optical transmission module connected between the second electrical/optical converting element and the first optical/electrical converting element.

6. The image forming apparatus according to claim 3, wherein the second relay substrate further includes a first light-emitting element that converts a low voltage differential signal into a light, and emits the light; and a first light-receiving element that receives a light, and converts the light into a low voltage differential signal, and the third relay substrate further includes a second light-emitting element that converts a low voltage differential signal into a light, and emits the light; and a second light-receiving element that receives a light, and converts the light into a low voltage differential signal, wherein a signal is transmitted between the second relay substrate and the third relay substrate via optical communication between the first light-emitting element and the second light-receiving element, and optical communication between the second light-emitting element and the first light-receiving element.

7. The image forming apparatus according to claim 3, wherein the second relay substrate further includes a first transmitting unit that modulates a low voltage differential signal into a radio signal, and transmits the radio signal; and a first receiving unit that receives a radio signal, and demodulates the radio signal into a low voltage differential signal, and the third relay substrate further includes a second transmitting unit that modulates a low voltage differential signal into a radio signal, and transmits the radio signal; and a second receiving unit that receives a radio signal, and demodulates the radio signal into a low voltage differential signal, wherein a signal is transmitted between the second relay substrate and the third relay substrate via radio communication between the first transmitting unit and the second receiving unit, and radio communication between the second transmitting unit and the first receiving unit.

8. The image forming apparatus according to claim 2, wherein a signal is transmitted between the second relay substrate and the third relay substrate via a harness connected between the second relay substrate and the third relay substrate.

9. The image forming apparatus according to claim 2, wherein the second relay substrate further includes a first electrical/optical converting element that converts a low voltage differential signal into an optical signal; and a first optical/electrical converting element that converts an optical signal into a low voltage differential signal, and the third relay substrate further includes a second electrical/optical converting element that converts a low voltage differential signal into an optical signal; and a second optical/electrical converting element that converts an optical signal into a low voltage differential signal, wherein a signal is transmitted between the second relay substrate and the third relay substrate via an optical transmission module connected between the first electrical/optical converting element and the second optical/electrical converting element, and an optical transmission module connected between the second electrical/optical converting element and the first optical/electrical converting element.

10. The image forming apparatus according to claim 2, wherein the second relay substrate further includes a first light-emitting element that converts a low voltage differential signal into a light, and emits the light; and a first light-receiving element that receives a light, and converts the light into a low voltage differential signal, and the third relay substrate further includes a second light-emitting element that converts a low voltage differential signal into a light, and emits the light; and a second light-receiving element that receives a light, and converts the light into a low voltage differential signal, wherein a signal is transmitted between the second relay substrate and the third relay substrate via optical communication between the first light-emitting element and the second light-receiving element, and optical communication between the second light-emitting element and the first light-receiving element.

11. The image forming apparatus according to claim 2, wherein the second relay substrate further includes a first transmitting unit that modulates a low voltage differential signal into a radio signal, and transmits the radio signal; and a first receiving unit that receives a radio signal, and demodulates the radio signal into a low voltage differential signal, and the third relay substrate further includes a second transmitting unit that modulates a low voltage differential signal into a radio signal, and transmits the radio signal; and a second receiving unit that receives a radio signal, and demodulates the radio signal into a low voltage differential signal, wherein a signal is transmitted between the second relay substrate and the third relay substrate via radio communication between the first transmitting unit and the second receiving unit, and radio communication between the second transmitting unit and the first receiving unit.

12. The image forming apparatus according to claim 1, wherein the printing device further includes a first signal converting unit that receives a first signal from the control unit, and converts the first signal into a low voltage differential signal, and receives a low voltage differential signal from the scanning device, and converts the low voltage differential signal from the scanning device into a second signal; and a second signal converting unit that receives a third signal from each of the units in the scanning device, and converts the third signal into a low voltage differential signal, and receives a low voltage differential signal from the printing device, and converts the low voltage differential signal from the printing device into a fourth signal.

13. The image forming apparatus according to claim 12, wherein the first relay substrate includes a switch that selects between a first operation mode for relaying a signal between each of the units in the scanning device and the control unit, and a second operation mode for relaying a signal between each of the units in the scanning device and the control unit via the first signal converting unit.

14. The image forming apparatus according to claim 13, wherein a signal is transmitted between the first relay substrate and the control unit via a harness connected between the first relay substrate and the control unit.

15. The image forming apparatus according to claim 12, wherein a signal is transmitted between the first relay substrate and the control unit via a harness connected between the first relay substrate and the control unit.

* * * * *